United States Patent
Chakravarthi et al.

(10) Patent No.: US 12,456,084 B2
(45) Date of Patent: Oct. 28, 2025

(54) SYSTEM AND METHOD FOR IMPROVING INTERACTIONS PERFORMED IN A VIRTUAL ENVIRONMENT

(71) Applicant: Bank of America Corporation, Charlotte, NC (US)

(72) Inventors: Suryanarayan Parthasarathi Chakravarthi, Tamilnadu (IN); Chetan Singh Naruka, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 18/314,686

(22) Filed: May 9, 2023

(65) Prior Publication Data
US 2024/0378530 A1 Nov. 14, 2024

(51) Int. Cl.
 G06Q 10/0633 (2023.01)
 G06F 21/31 (2013.01)
 G06T 17/00 (2006.01)

(52) U.S. Cl.
 CPC ......... G06Q 10/0633 (2013.01); G06F 21/31 (2013.01); G06T 17/00 (2013.01)

(58) Field of Classification Search
 CPC .......................................... G06F 1/00–2219/00
 USPC ................................................ 705/7.11–7.42
 See application file for complete search history.

(56) References Cited

U.S. PATENT DOCUMENTS

| | | | |
|---|---|---|---|
| 6,215,498 B1 * | 4/2001 | Filo | G06T 15/00 345/473 |
| 8,082,297 B2 | 12/2011 | Syvain et al. | |
| 8,751,393 B1 * | 6/2014 | Murray | G06Q 40/02 705/42 |
| 8,751,948 B2 | 6/2014 | Wetzer et al. | |
| 9,165,426 B2 | 10/2015 | Jones et al. | |
| 9,677,901 B2 | 6/2017 | Yamamoto | |
| 9,875,580 B2 | 1/2018 | Cannon et al. | |
| 10,218,649 B2 | 2/2019 | Joo et al. | |
| 10,242,032 B2 | 3/2019 | Sundaresan et al. | |
| 10,326,667 B2 | 6/2019 | Jones et al. | |
| 10,542,300 B2 | 1/2020 | Breitenfeld et al. | |
| 10,976,804 B1 | 4/2021 | Atlas et al. | |
| 11,789,759 B2 * | 10/2023 | Cherry | G06F 9/453 715/705 |
| 11,803,416 B1 * | 10/2023 | Garner, IV | H04L 9/50 |
| 11,935,205 B2 * | 3/2024 | Whitney | G06F 3/011 |

(Continued)

FOREIGN PATENT DOCUMENTS

| | | |
|---|---|---|
| CN | 102939791 B | 9/2015 |
| CN | 106845335 B | 3/2020 |

(Continued)

*Primary Examiner* — Alan S Miller

(57) ABSTRACT

A system includes a memory and a processor coupled to the memory. The processor receives from a first user device a request from a first user to perform a first task in a virtual environment and presents a first scene to the first user in the virtual environment. Upon determining that the first user has not responded within a threshold time period, the processor obtains and presents one or more assistive features associated with the first scene. After presenting the first scene with the assistive features, the processor detects an input from the first user device associated with the first scene and processes the first step in the virtual environment based on the input.

20 Claims, 4 Drawing Sheets

(56) References Cited

U.S. PATENT DOCUMENTS

| | | | |
|---|---|---|---|
| 12,073,347 B2* | 8/2024 | Miller | G06Q 10/06316 |
| 2003/0120823 A1* | 6/2003 | Kim | H04L 67/131 |
| | | | 719/310 |
| 2010/0228633 A1 | 9/2010 | Guimaraes et al. | |
| 2011/0072367 A1 | 3/2011 | Bauer | |
| 2013/0073343 A1* | 3/2013 | Richardson | G06Q 10/06 |
| | | | 705/7.38 |
| 2013/0203026 A1* | 8/2013 | Sundaresh | G09B 7/00 |
| | | | 434/219 |
| 2015/0356780 A1* | 12/2015 | Madegowda | G09B 19/00 |
| | | | 345/633 |
| 2016/0219048 A1* | 7/2016 | Porras | H04L 41/147 |
| 2017/0103432 A1* | 4/2017 | Borchetta | G06Q 30/0279 |
| 2018/0342106 A1* | 11/2018 | Rosado | G06Q 10/109 |
| 2019/0340004 A1* | 11/2019 | Garay | G06F 9/5027 |
| 2019/0392728 A1* | 12/2019 | Pike | G09B 19/003 |
| 2020/0020172 A1 | 1/2020 | Rogers et al. | |
| 2020/0066049 A1* | 2/2020 | Sun | G06Q 10/10 |
| 2020/0338458 A1 | 10/2020 | Huang et al. | |
| 2021/0334753 A1* | 10/2021 | Catalano | G06Q 10/06316 |
| 2022/0050694 A1* | 2/2022 | Cherry | G06Q 10/06315 |
| 2022/0245898 A1* | 8/2022 | Bruso | G06F 16/7328 |
| 2022/0277248 A1* | 9/2022 | Miller | G06Q 10/109 |
| 2022/0360844 A1* | 11/2022 | Arana | H04N 21/44008 |
| 2022/0374645 A1* | 11/2022 | Santoro | G06N 3/084 |
| 2023/0005206 A1 | 1/2023 | Yoo et al. | |
| 2023/0034686 A1 | 2/2023 | Zheng | |
| 2023/0196668 A1* | 6/2023 | Bramlet | H04N 21/2356 |
| | | | 345/419 |
| 2023/0196938 A1* | 6/2023 | Bramlet | H04N 13/351 |
| 2023/0342989 A1* | 10/2023 | Lehtiniemi | G06T 11/00 |
| 2023/0353652 A1* | 11/2023 | Bi | H04L 67/55 |
| 2024/0045704 A1* | 2/2024 | Khorshid | G06F 3/011 |
| 2024/0071603 A1* | 2/2024 | Gupta | G06F 9/453 |
| 2024/0139956 A1* | 5/2024 | Cui | H04L 65/80 |
| 2024/0226717 A9* | 7/2024 | Sidorin | A63F 13/24 |

FOREIGN PATENT DOCUMENTS

| | | |
|---|---|---|
| CN | 106919270 B | 4/2020 |
| CN | 113050802 A | 6/2021 |
| JP | 5340709 B2 | 11/2013 |
| KR | 101923723 B1 | 11/2018 |

\* cited by examiner

SYSTEM AND METHOD FOR IMPROVING INTERACTIONS PERFORMED IN A VIRTUAL ENVIRONMENT

TECHNICAL FIELD

The present disclosure relates generally to network communication, and more specifically to a system and method for improving interactions performed in a virtual environment.

BACKGROUND

Often when a user engages in an interaction session in a virtual environment to perform a desired task, the user needs to navigate through several steps to successfully complete the task. The user needs to make several decisions while performing the task and a decision the user makes at each step while performing the task decides the subsequent navigation path (e.g., steps) taken by the user. This places a considerable burden on the user. Not all users are technology savvy and/or sufficiently educated and informed to make such decisions needed to complete a particular task. Further, the system may need to load and present several alternatives associated with each step of the task simultaneously as it is unknown which of the alternatives may be selected by the user. This places a significant burden on system resources including processing, memory and network resources.

SUMMARY

The system and methods implemented by the system as disclosed in the present disclosure provide technical solutions to the technical problems discussed above by intelligently determining a sequence of steps that can be performed to complete a particular task in the virtual environment. The disclosed system and methods provide several practical applications and technical advantages.

For example, the disclosed system and methods provide the practical application of determining a most popular and/or a reduced sequence of steps that may be performed to complete a particular task in the virtual environment. A most popular sequence of steps may include a sequence of steps performed by most users to complete the particular task. A reduced sequence of steps may include the minimum steps that may be performed in a particular sequence to complete the task. As described in embodiments of the present disclosure a virtual-world server may be configured to monitor a set of steps performed by each of a plurality of users for completing the particular task. Virtual-world server compares the sets of steps performed by each user of the plurality of users to complete the same particular task and determines a sequence of steps that was performed by at least a threshold number of users to complete the task. Additionally or alternatively, based on comparing the sets of steps performed by the plurality of users, virtual-world server may determine a reduced (e.g., minimum) sequence of steps that were performed by at least a threshold number of users to complete the particular task. Virtual-world server may present this determined sequence of steps to other users subsequently desiring to perform the particular task.

By presenting a pre-decided sequence of steps to users, the disclosed system and method save the users from the burden of making several decisions relating to selection of options and alternatives at one or more steps while performing the particular task. This improves time taken to complete the particular task and completion statistics associated with the particular task. Further, as the particular steps and the sequence of the steps to be presented to a user are known, the system may need to load on a user device only those steps that are part of the particular sequence of steps and no other steps, options and/or alternatives. Further, since the particular sequence of steps to be loaded onto the user device is known beforehand, the system may access from the memory metadata related to the steps that are part of the particular sequence of steps and transmit the metadata to the first user device for rendering on the user device, thus improving speed of rendering at the first user device. This may save computing resources (e.g., processing, memory, network bandwidth etc.) which would otherwise be needed to access from the memory metadata associated with all alternative options and/or sub-steps associated with each step, transmit all the metadata to the user device and render all the alternative options and/or sub-steps on the user device. Thus, the above technique may improve processing efficiency at the virtual-world server as well as the user device.

Thus, the disclosed system and method generally improve the technology related to performing interactions in the virtual environment.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
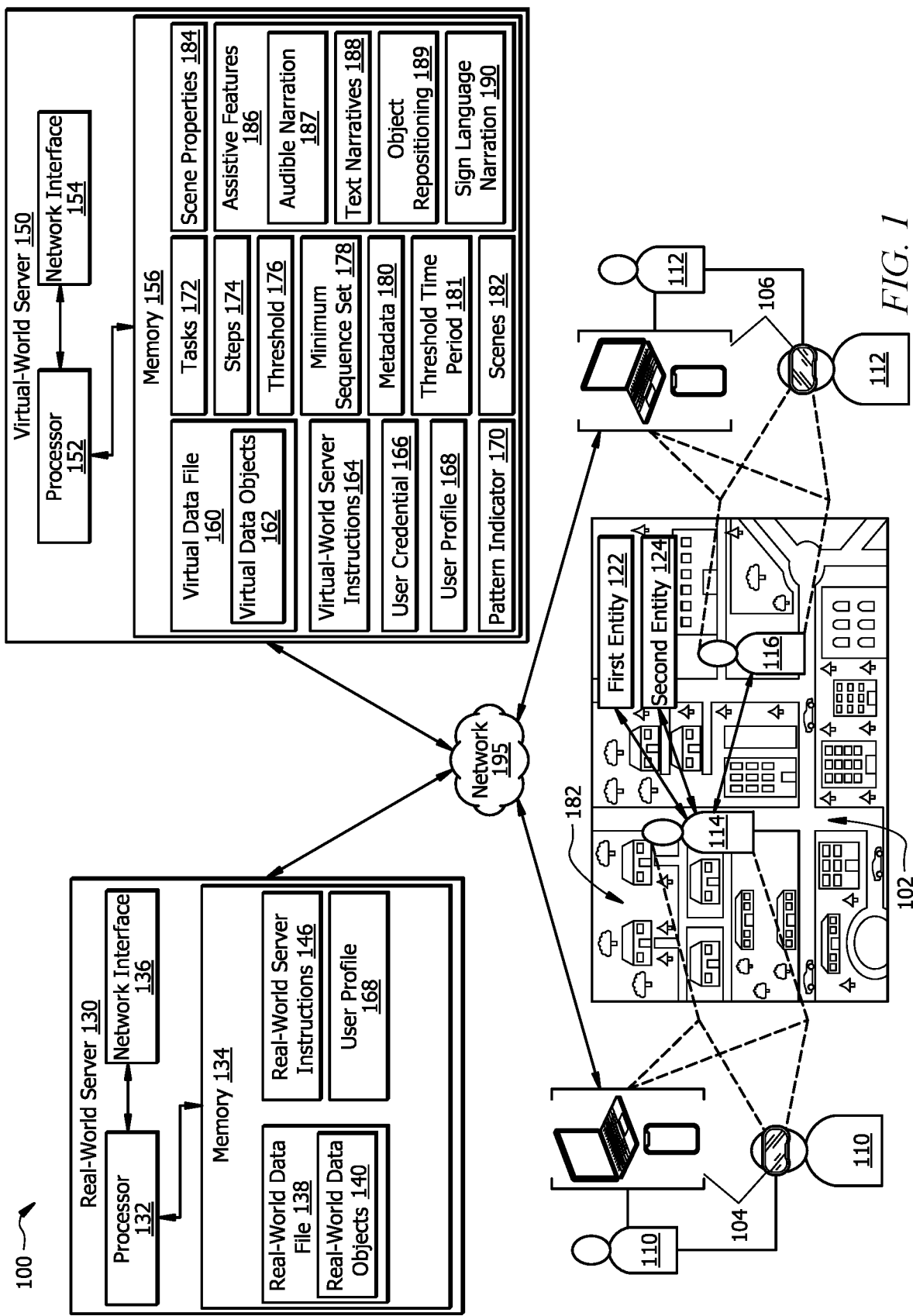
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and a virtual-world server 150, each connected to a network 195. A first user 110 is associated with the first user device 104 and a second user 112 is associated with the second user device 106. The system 100 may be communicatively coupled to the communication network 195 and may be operable to transmit data between each one of the first user device 104, second user device 106, real-world server 130, and virtual-world server 150 through the communication network 195.

In general, the system 100 may improve interoperability of real-world systems and virtual world systems (e.g., metaverse systems) so that information may be seamlessly shared between these systems to implement data security, authorization of data interactions, access to a virtual environment 102 (e.g., metaverse environment), access to entities 122/124 within the virtual environment 102 and other data interactions performed in real-world and virtual environments. For example, user information collected from a user (e.g., first user 110) and/or assigned to the user in a real-world environment may be used in the virtual environment 102 (e.g., metaverse environment) to authenticate the first user 110 before allowing the first user 110 to access the virtual environment 102 and perform any kind of action or interaction within the virtual environment 102. Additionally or alternatively, user information collected from the first user 110 and/or assigned to the first user 110 in the real-world environment or virtual environment 102 may be used in the virtual environment 102 (e.g., metaverse environment) to provide the first user 110 access to products, services and/or experiences within the virtual environment 102. This process provides improved information security because it authenticates that a first avatar 114 is associated with the first user 110, not an unauthorized party, and that the first user 110 is authorized to access the virtual environment 102, obtain products, services and experiences within the virtual environment 102 and perform data interactions. Further, a user may obtain a product, service or experience by transferring real-world data objects between real-world entities based on data interactions performed in the virtual environment 102.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any other user (e.g., second user 112) connected to network 195.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable, and user defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities through a respective avatar. For example, the second user 112 may attempt to engage in an interaction session with the first avatar 114 through a second avatar 116 associated with the second user 112. In another example, the first avatar 114 of the first user 110 may access a virtual sub-environment (not shown) within the virtual environment 102 and perform virtual data interactions within the virtual sub-environment. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs, the virtual-world server 150 may authenticate that the first avatar 114 is associated with the first user 110 and not an unauthorized third-party. For example, the first user 110 may be required to sign into a secure portal that provides access to a data file (e.g., real-world data file 138 and/or virtual data file 160) associated with the first user 110. As shown in FIG. 1, a real-world data file 138 of the first user 110 is stored and managed by the real-world server 130 and a virtual data file 160 of the first user 110 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160. Similarly, the real-world server 130 may employ single sign-on (SSO), multifactor authentication, or any other suitable authentication scheme in order to allow the first user 110 access to the real-world data file 138. The virtual data file 160 and the real-world data file 138 may include virtual data objects 162 and real-world data objects 140 respectively owned by the first user 110. The real-world server 130 and the virtual-world server 150 may store other information related to the first user 110 including, but not limited to, user profile 168, account information (e.g., including identity and other details relating to the respective data files 138 and 160), avatar information, digital assets (e.g., respective real-world data objects 140 and virtual data objects 162) information, or any other suitable type of information that is associated with a user within the virtual environment 102 and/or the real-world environment.

As shown in FIG. 1, virtual-world server 150 comprises a processor 152, a memory 156, and a network interface 154. The processor 152 comprises one or more processors operably coupled to the memory 156. The processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 164) to implement the virtual-world server 150. In this way, processor 152 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 1, 3 and 4. For example, the processor 152 may be configured to perform at least a portion of the method 300 as described in FIG. 3 and/or method 400 as described in FIG. 4.

The memory 156 comprises one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store user credential 166, user profile 168, virtual data file 160, virtual data objects 162, pattern indicator 170, tasks 172, steps 174, threshold 176, minimum sequence set 178, metadata 180, scenes 182, scene properties 184, assistive features 186 including audible narration 187, text narratives 188, object repositioning 189 and sign language narration 190, and the virtual-world server instructions 164. The virtual-world server instructions 164 may include any suitable set of instructions, logic, rules, or code operable to execute the virtual-world server 150.

The network interface 154 is configured to enable wired and/or wireless communications. The network interface 154 is configured to communicate data between the virtual-world server 150 and other devices, systems, or domains (e.g. user devices 104 and 106 and real-world server 130). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

The real-world server 130 comprises a processor 132, a memory 134, and a network interface 136. The processor 132 comprises one or more processors operably coupled to the memory 134. The processor 132 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with the memory 134. The one or more processors are configured to process data and may be implemented in hardware or software. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 146) to implement the real-world server 130. In this way, processor 132 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1, 3, and 4. For example, the processor 132 may be configured to perform at least a portion of the method 300 as described in FIG. 3 and/or method 400 as described in FIG. 4.

The memory 134 comprises one or more disks, tape drives, or solid-state drives, and may be used as an over-flow data storage device, to store programs when such programs are selected for execution, and to store instructions and data that are read during program execution. The memory 134 may be volatile or non-volatile and may comprise a read-only memory (ROM), random-access memory (RAM), ternary content-addressable memory (TCAM), dynamic random-access memory (DRAM), and static random-access memory (SRAM).

The memory 134 is operable to store information relating to real-world data file 138, real-world data objects 140, user profile 168 and the real-world server instructions 146. The real-world server instructions 146 may include any suitable set of instructions, logic, rules, or code operable to execute the real-world server 130.

The network interface 136 is configured to enable wired and/or wireless communications. The network interface 136 is configured to communicate data between the real-world server 130 and other devices, systems, or domains (e.g. user devices 104 and 106, and virtual-world server 150). For example, the network interface 136 may comprise a Wi-Fi interface, a LAN interface, a WAN interface, a modem, a switch, or a router. The processor 132 is configured to send and receive data using the network interface 136. The network interface 136 may be configured to use any suitable type of communication protocol as would be appreciated by one of ordinary skill in the art.

Each of the real-world server 130 and the virtual-world server 150 is generally a suitable server (e.g., including a physical server and/or virtual server) operable to store data in a memory (e.g., respective memories 134 and 156) and/or provide access to application(s) or other services. One or both of the real-world server 130 and the virtual-world server 150 may be a backend server associated with a particular entity (e.g., organization) that facilitates conducting data interactions between entities, between one or more users, and/or between a user and an entity. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 195 may facilitate communication within the system 100. This disclosure contemplates the communication network 195 being any suitable network operable to facilitate communication between the first user device 104, second user device 106, real-world server 130, and virtual-world server 150. Communication network 195 may include any interconnecting system capable of transmitting audio, video, signals, data, messages, or any combination of the preceding. Communication network 195 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Figure 2:
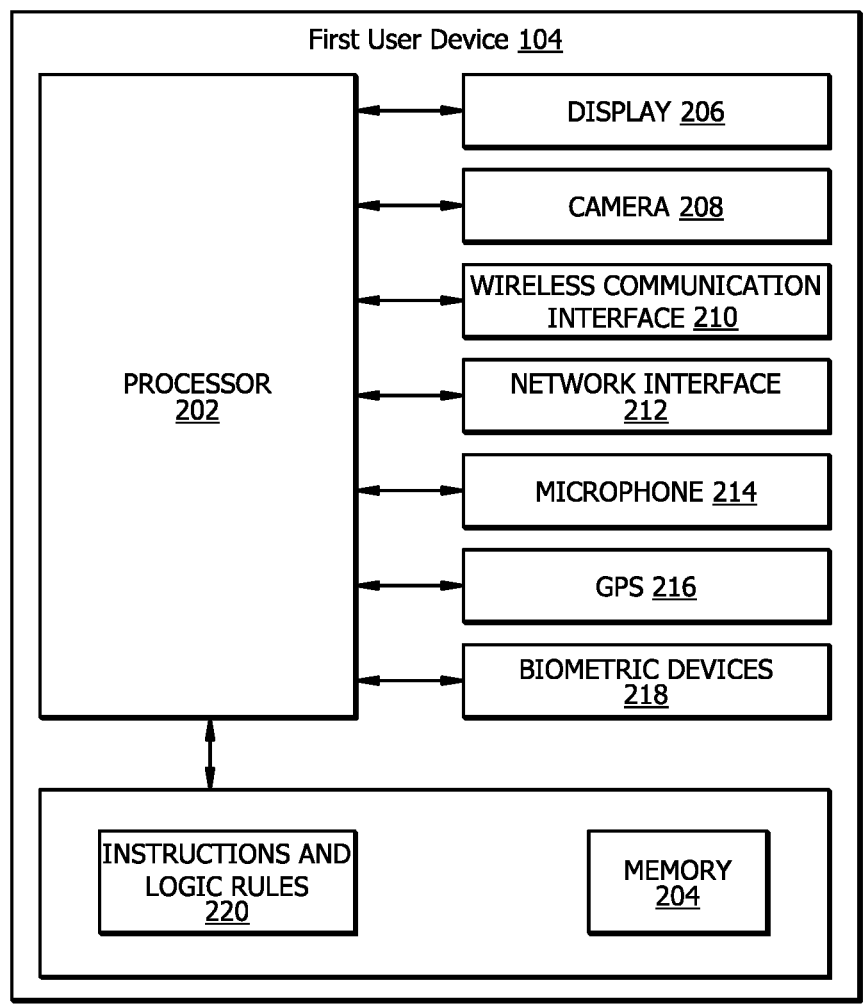
FIG. 2 is a block diagram of an embodiment of the first user device used by the system of FIG. 1.

Each of the user devices (i.e., first user device 104 and second user device 106) may be any computing device configured to communicate with other devices, such as a server (e.g., real-world server 130, virtual-world server 150), databases, etc. through the communication network 195. Each of the user devices may be configured to perform specific functions described herein and interact with one or both of real-world server 130 and the virtual-world server 150, e.g., via respective user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.
Example User Device FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity (e.g., represented by first entity 122 and/or second entity 124 in the virtual environment 102).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1, 3 and 4. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
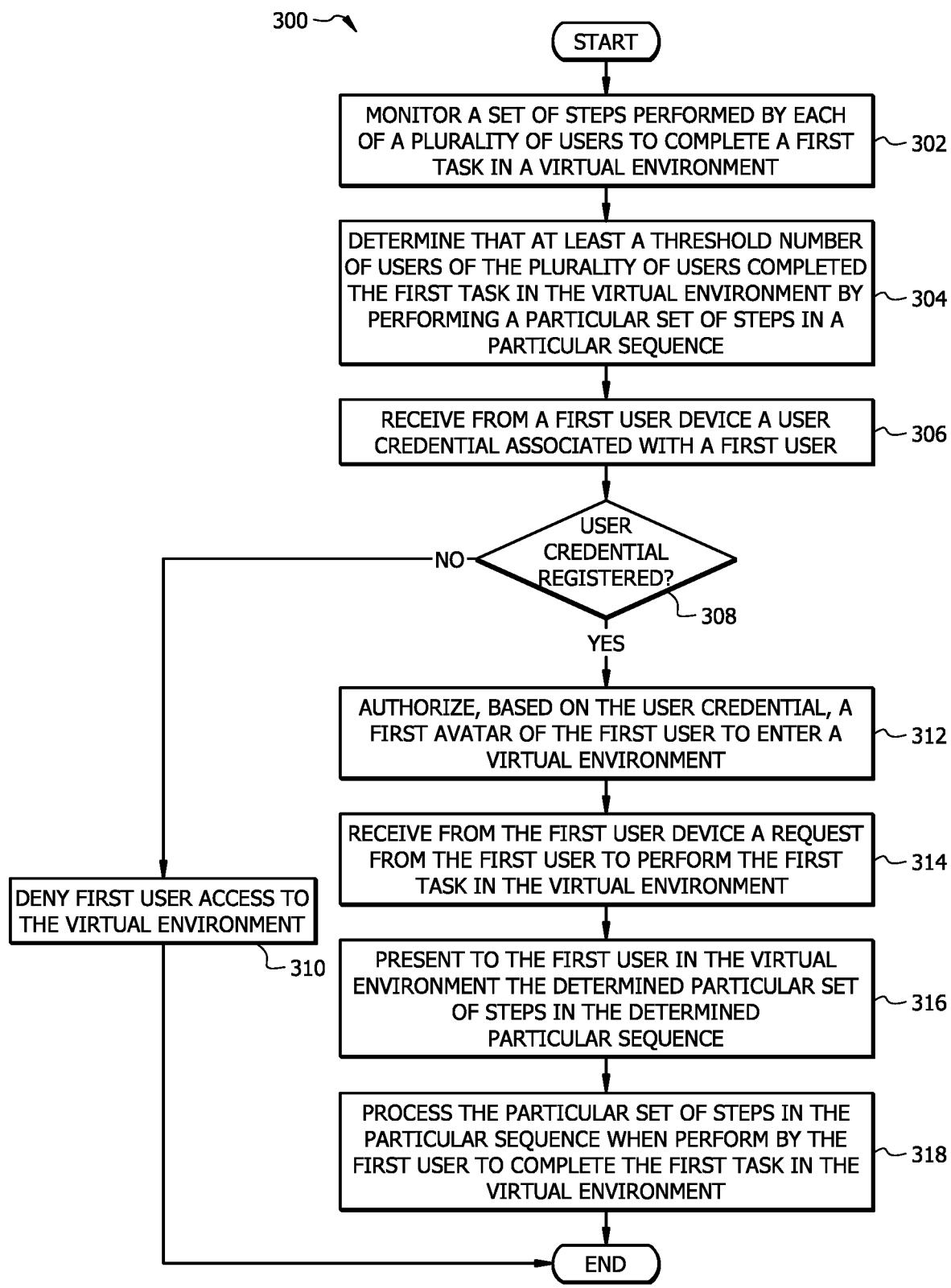
FIG. 3 illustrates a flowchart of an example method for performing a task in a virtual environment, in accordance with one or more embodiments of the present disclosure.
Figure 4:
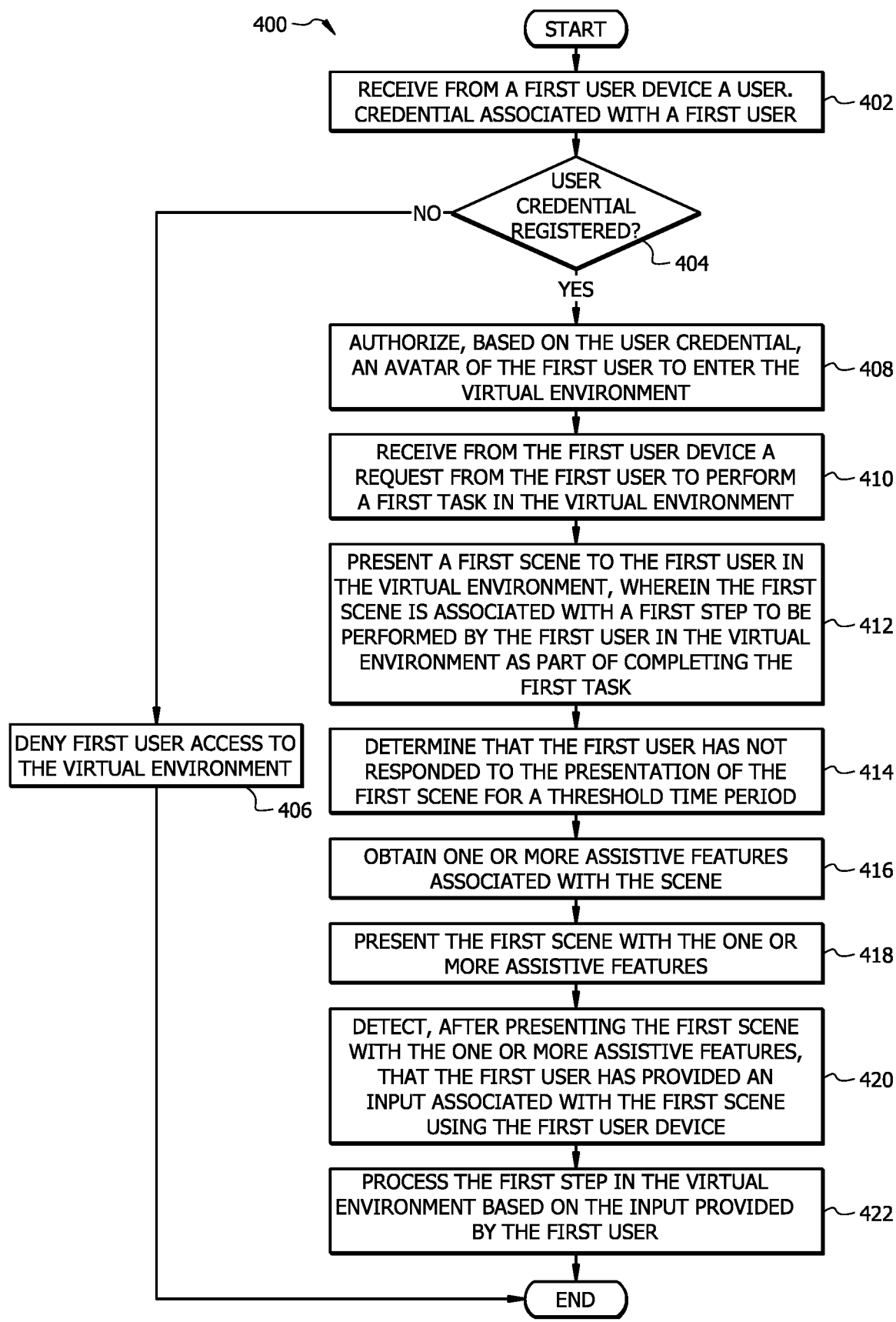
FIG. 4 illustrates a flowchart of an example method for assisting a user in performing a task in a virtual environment, in accordance with one or more embodiments of the present disclosure.

The memory 204 is operable to store any of the information described with respect to FIGS. 1, 3 and 4 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user profile 168), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the entity or organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). When the real-world server 130 and/or the virtual-world server 150 are owned and/or operated by a particular entity or organization (e.g., are part of the IT infrastructure of the entity or organization), being registered with the real-world server 130 and/or the virtual-world server 150 may also be interpreted as being registered with the particular entity or organization. For example, when the first user 110 is registered with the virtual-world server 150, this may be interpreted as the first user 110 being registered with the entity or organization that owns and/or manages the virtual world server 150. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations. For example, the real-world server 130 may be owned and/or operated by a first entity and the virtual-world server 150 may be owned and/or operated by a second entity different from the first entity.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by real-world server 130 as part of user profile 168 of the first user 110. In one embodiment, at least a portion of the user profile 168 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 138 for the first user 110 in which the first user 110 may store real-world data objects 140 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 138 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be requested to provide information necessary to verify the identity of the first user 110 and register the first user 110 with the real-world server 130.

Information relating to the real-world data file 138 of the first user 110 may be stored as part of the user profile 168 of the first user 110. This information may include, but is not limited to, an identity (e.g., unique name or number) of the real-world data file 138, amount of real-world data objects 140 stored in the real-world data file 138, a log of data interactions conducted in relation to the real-world data file 138 and any other information relating to the real-world data file 138.

Once registered with the real-world server 130, the real-world server 130 may allow the first user 110 to perform one or more data interactions in the real-world environment. For example, a real-world data interaction may include transferring one or more real-world data objects 140 from the real-world data file 138 of the first user 110 to a second real-world data file (not shown) of the second user 112 or another entity. Another example data interaction may include receiving one or more real-world data objects 140 in the real-world data file 138 of the first user 110 from the second real-world data file of the second user 112 or another entity. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user profile 168 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may provide the first user 110 an option to additionally register with the virtual-world server 150 which may allow the first user 110 to perform data interactions in the virtual environment 102. Registration with the virtual-world server 150 may include generating a user credential 166 that allows the first user 110 to log in to the virtual-world server 150 and enter the virtual environment 102 via first avatar 114 of the first user 110. Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 138 of the first user 110. For example, the virtual data file 160 is a virtual image of the real-world data file 138, wherein the virtual data objects 162 correspond to the real-world data objects 140. In other words, the virtual data file 160 is a virtual representation of the real-world data file 138. In another example, the virtual data file 160 stores a portion of the real-world data objects 140 in the form of virtual data objects 162. In another example, real-world data objects 140 may be converted to virtual data objects 162, and vice versa. In this case, there may not be a one-to-one conversion between the real-world data objects 140 and virtual data objects 162. For example, one real-world data object 140 may be converted to a plurality of virtual data objects 162, wherein the conversion ratio may dynamically change from time to time. In one embodiment, when the real-world server 130 and the virtual-world server 150 are owned and/or managed by the same entity or organization, the first user 110 may use the same user credential 166 to login to the real-world server 130 as well as the virtual-world server 150.

Information relating to the virtual data file 160 of the first user 110 may be stored by the virtual-world server 150 as part of the user profile 168 of the first user stored at the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160.

In certain embodiments, when the real-world server 130 and the virtual-world server 150 are owned and/or managed by different entities, first user 110 may separately register with one of the real-world server 130 and the virtual-world server 150 without registering with the other. For example, when the real-world server 130 is registered with a first entity and the virtual-world server 150 is registered with a second entity different from the first entity, first user 110 may separately register with the virtual-world server 150 without registering or needing to register with the real-world server 130. For example, as the first user 110 separately registers with the virtual-world server 150, the virtual-world server 150 may collect several pieces of information from the first user 110 including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by virtual-world server 150 as part of user profile 168 of the first user 110. In one embodiment, at least a portion of the user profile 168 relating to the first user 110 collected in by the virtual-world server 150 may be stored in the real-world server 130. Once the identity of the first user 110 is confirmed and all other information provided by the first user 110 is verified to be correct, the virtual-world server 150 may generate the virtual data file 160 for the first user 110 in which the first user 110 may store virtual data objects 162 owned by the first user 110.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112 or another entity. Another example data interaction may include receiving one or more virtual data objects 162 in the virtual data file 160 of the first user 110 from the second virtual data file of the second user 112 or another entity. Another example data interaction may include requesting by the first user 110 transfer of virtual data objects 162 from a data file of a second user to a data file of a third user as part of satisfying an agreement between the first user 110 and the third user. Another example data interaction may include modifying at least a portion of the user profile 168 (e.g., user credentials to access the real-world server, phone numbers, residential address, email address, information relating to user assets etc.) stored at the virtual-world server 150.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 195.

Determine a Sequence of Steps to Complete a Task in the Virtual Environment

Often when a user (e.g., first user 110) engages in an interaction session in the virtual environment 102 to perform a desired task, the user needs to navigate through several steps to successfully complete the task. For example, when the first user 110 desires to obtain a virtual travel experience in the virtual environment 102, the first user 110 may need to select a travel destination from a plurality of travel destinations available for selection, select a mode of transport, select a hotel, select restaurants, select activities at the desired destination and then finally select a method to transfer data objects (e.g., virtual data objects 162) to one or more entities providing these product/services in the virtual environment 102 to obtain the selected travel experience. Each step that is to be performed while completing a task may include several options and/or sub-steps, and a navigation path followed by the user from that point on is decided by the particular option selected by the user and/or the particular sub-step performed by the user. For example, when selecting a travel experience in the virtual environment 102, the first user 110 may be presented with several travel destinations. Each travel destination may be associated with a unique set of transport options, hotels, restaurants activities etc. Thus, the set of travel options available to the first user 110 is based on the particular travel destination the first user 110 selects at this step. For example, when the first user 110 selects a particular travel destination, the system may present in the next step transport options available for the selected destination. Again, the subsequent step is decided by the particular transport option selected by the first user 110. For example, when the user selects "flights" as the mode of transport to the selected travel destination, the system may present the flight options available for the selected travel destination. Similarly, the options and sub-steps presented to the user at every step of the task being performed depends on the selections made and/or sub-steps performed in the previous step.

Further, in some cases, the system may not be configured to present a task as a sequence of steps to the user. For example, the system may not be configured to automatically present a next step to the user when a previous step is completed. A set of options and/or sub-steps associated with different steps that are needed to complete the task may be provided by different entities in the virtual environment 102. For example, a first virtual portal may allow the first user 110 to research several travel destinations and select a travel destination, a second virtual portal may allow the first user 110 to view and select several transport options associated with the selected travel destination, a third virtual portal may allow the first user 110 to view and select hotels at the selected destination, a fourth virtual portal may allow the first user 110 to view and make restaurant reservations, and a fifth virtual portal may allow the first user 110 to transfer data objects (e.g., virtual data objects 162) to one or more entities that operate the first, second, third and fourth portals to receive the selections made by the first user 110. Further several entities may provide the options and/or sub-steps associated with a particular step in the virtual environment 102, and it is up to the user to decide which entity to use for performing the particular step. For example, several virtual portals may provide transport services to the selected travel destination, and it is up to the first user 110 to decide which of the virtual portals to use to view and select a transport option for the travel experience.

Thus, a user needs to make several decisions while performing a task in the virtual environment 102 and the decision a user makes at each step while performing the task decides the subsequent navigation path (e.g., steps) taken by the user. This places a considerable burden on a user. Not all users are technology savvy and/or sufficiently educated and informed to make such decisions needed to complete a particular task. Further, the system (e.g., virtual world server 150) may need to load and present several alternatives associated with each step of the task simultaneously as it is unknown which of the alternatives may be selected by the user. This places a significant burden on system resources including processing, memory and network resources.

Embodiments of the present disclosure discuss techniques to intelligently determine a sequence of steps that can be performed to complete a particular task in the virtual environment.

For example, virtual-world server 150 may be configured to determine a reduced sequence of steps (e.g., steps 174) that may be performed to complete a particular task (e.g., task 172) in the virtual environment 102. In one example, a reduced sequence of steps 174 may include the minimum steps 174 that may be performed in a particular sequence to complete the task. Example tasks may include, but are not limited to, obtaining a travel experience, signing up for a virtual event, and registering with an entity (e.g., first entity 122). While embodiments of the present disclosure are explained with reference to an example travel experience, a person having ordinary skill in the art may appreciate that the disclosed embodiments apply to any task 172 that may be performed in the virtual environment 102.

Virtual-world server 150 may store several tasks 172 that may be performed by users (e.g., first user 110) in the virtual environment 102. Each task 172 may include a plurality of steps 174 that the first user 110 may perform to complete the task 172. A particular task 172 may be completed by taking multiple alternative paths including performing multiple alternative sequence of steps 174, wherein each alternative sequence of steps 174 may include a different set of steps 174 performed in a particular sequence. In some embodiments, two alternative sequence of steps 174 may include the same set of steps 174 performed in a different sequence. In this context, each step 174 associated with a particular task 172 may include several alternative options and/or alternative sub-steps that may be selected and/or performed respectively by the first user 110. Each alternative option or sub-step selected by the first user 110 at a particular step 174 while performing a particular task 172 may take the first user 110 down a different path to completing the particular task 172. For example, virtual-world server 150 may store a plurality of steps 174 with regard to obtaining a travel experience in the virtual environment 102. The steps 174 may include but are not limited to, selecting a travel destination, selecting a mode of transport, selecting a hotel, selecting a restaurant, selecting an activity at the desired destination, and selecting a method to transfer data objects (e.g., virtual data objects 162) to one or more entities providing these travel product/services in the virtual environment 102. The virtual-world server 150 may further store alternative options or sub-steps associated with one or more of these steps 174. For example, alternative options relating to the step 174 of selecting a mode of transport may include alternative transport options including flights, trains, buses, cars etc. Further, the alternative options may include using alternative virtual portals to select one or more of the transport options. Similarly, alternative options relating to the step 174 of selecting a hotel may include using alternative virtual portals to select a hotel at the desired travel destination. A selection of a particular alternative option at a particular step typically decides the next one or more steps 174 that may be followed by the first user 110 to complete the task 172 of obtaining the travel experience.

Virtual-world server 150 may be configured to monitor a set of steps 174 performed by each of a plurality of users (e.g., first user 110, second user 112 etc.) for completing a particular task 172. As described in more detail below, virtual-world server 150 may be configured to determine a reduced (e.g., minimum) sequence set 178 for performing the particular task 172 based on the sets of steps 174 performed by the plurality of users to complete the same particular task 172. Based on the sets of steps 174 performed by a plurality of users to complete the same particular task 172, virtual-world server 150 may be configured to determine a pattern relating to the steps 174 followed to complete the particular task 172 and the sequence in which the steps 174 were performed while completing the particular task 172. For example, virtual-world server 150 may be configured to determine when several users follow the same steps 174 in the same sequence to complete the particular task 172. When a certain number of users (e.g., equaling or exceeding a pre-set threshold number 176) perform the same steps 174 in the same sequence for completing a particular task 172, it is indicative that the sequence of steps 174 is popular among users and that most users are likely to follow this same sequence of steps 174 to complete the particular task 172.

In one or more embodiments, virtual-world server 150 may be configured to compare the sets of steps 174 performed by each user of a plurality of users to complete the same particular task 172. Each time a user performs a particular sequence of steps 174 that was previously performed by one or more other users to complete the particular task 172, virtual-world server 150 increments a numerical indicator (e.g., a numerical counter) associated with that particular sequence of steps 174, wherein the numerical indicator represents a number of times the same sequence of steps 174 was performed by users to complete the particular task 172. When the numerical indicator associated with a particular sequence of steps 174 equals or exceeds a threshold 176 number, virtual-world server 150 determines the particular sequence of steps 174 is the most popular sequence of steps in relation to completing the particular task 172. In one embodiment, when numerical indicators associated with two or more sequence of steps equal or exceed the threshold 176 number, virtual-world server 150 determines the sequence of steps 174 with the highest assigned numerical indicator as the most popular sequence of steps 174 in relation to completing the particular task 172. Once a most popular sequence of steps 174 has been determined, virtual-world server 150 automatically presents the determined most popular sequence of steps 174 to users (e.g., first user 110) subsequently requesting to perform the particular task 172. For example, with regard to a travel experience, virtual-world server 150 may determine that most users select a travel destination, select a flight using a first virtual portal, and select a hotel using a second virtual portal. In response to determining this popular sequence of steps 174 associated with obtaining a travel experience, virtual-world server 150 may present this same sequence of steps 174 to other users (e.g., first user 110) desiring to obtain a travel experience.

By presenting a pre-decided sequence of steps 174 to users (e.g., first user 110), virtual-world server 150 saves the users from the burden of making several decisions relating to selection of options and alternatives at one or more steps while performing the particular task 172. This improves time taken to complete the particular task 172 and completion statistics associated with the particular task 172. Further, by presenting the most popular sequence of steps 174 followed by most users to complete the particular task 172, virtual-world server 150 improves the likelihood that most users who are presented with the sequence of steps 174 are satisfied with the particular selection of options and alternatives associated with the presented sequence of steps 174 in relation to the particular task 172. In addition, as the particular steps and the sequence of the steps 174 to be presented to the first user 110 is known, the virtual-world server 150 may need to load on the first user device 104 only those steps that are part of the particular sequence of steps and no other steps, options and/or alternatives. Further, since the particular sequence of steps 174 to be loaded onto the first user device 104 is known beforehand, the virtual-world server 150 may access from the memory 156 metadata 180 related to the steps that are part of the particular sequence of steps and transmit the metadata 180 to the first user device 104 for rendering on the first user device 104, thus improving speed of rendering at the first user device 104. This may save computing resources (e.g., processing, memory, network bandwidth etc.) which would otherwise be needed to access from the memory 156 metadata associated with all alternative options and/or sub-steps associated with each step, transmit all the metadata to the first user device 104 and render all the alternative options and/or sub-steps on the first user device 104. Thus, the above technique may improve processing efficiency at the virtual-world server 150 as well as the first user device 104.

Additionally or alternatively, based on monitoring the sets of steps 174 performed by the plurality of users to complete the particular task 172, virtual-world server 150 may be configured to further determine a reduced sequence of steps 174 that may be performed to complete the particular task 172. In one example, the reduced sequence of steps 174 may include a minimum sequence set 178 that can be performed to complete the particular task 172. In one embodiment, the minimum sequence set 178 includes a minimum number of steps 174 that were performed by a threshold number (e.g., threshold 176) of users in a particular sequence to complete the particular task 172. The minimum sequence set 178 indicates that one or more steps that are not part of the minimum sequence set 178 were not performed by at least a threshold 176 number of users. This in turn indicates that steps not included in the minimum sequence set 178 may be optional and/or unimportant for at least the threshold number 176 of users in relation to completing the particular task 172. The sequence of steps 174 in the minimum sequence set 178 may be same or different from the most popular sequence of steps 174 that was performed by most users to complete the particular task 172.

In one or more embodiments, virtual-world server 150 may be configured to assign a pattern indicator 170 to each instance of completing the particular task 172 by a user based on a number of steps performed by the user to complete the particular task 172. In one or more embodiments, the pattern indicator 170 may be a numerical value (e.g., 0-10, 0-100 etc.), wherein the virtual-world server 150 may be configured to assign the pattern indicator 170 having a higher numerical value to an instance of completing the particular task 172 when a lower number of steps were performed by the user to complete the particular task 172. Thus, instances of completing the particular task 172 with lower number of steps 174 are assigned a pattern indicator 170 having a higher numerical value than instances of completing the particular task 172 with a higher number of steps 174.

Virtual-world server 150 may be configured to group together all instances of completing the particular task 172 having the highest assigned numerical values of the pattern indicator 170. For example, when the numerical value of the pattern indicator 170 ranges from 0-100, virtual-world server 150 may group together all instances of completing the particular task 172 that were assigned a pattern indicator value of 80, wherein no instance was assigned a pattern indicator 170 higher than 80. In one embodiment, all instances that are assigned the same numerical value of the pattern indicator 170 may have completed the particular task 172 by performing the same number of steps. For example, all instances of completing the particular task 172 having the pattern indicator value of 80 may have been completed the particular task 172 by performing 3 steps. Thus, in this case all instances of completing the particular task 172 by performing 3 steps are grouped together in a single group. Virtual-world server 150 may be configured to compare the sets of steps 174 corresponding to each instance of completing the particular task 172 in the group. Following the above example, virtual-world server 150 may compare the sets of 3 steps associated with each instance from the group. Based on this comparison, virtual-world server 150 may be configured to identify a particular sequence of steps 174 from the group where at least a threshold number 176 of instances from the group relating to the identified particular sequence of steps include performing the same steps in the same sequence. Following the above example, virtual-world server 150 may be configured to determine a particular sequence of 3 steps from the group where at least a threshold number 176 of instances from the group include performing the same 3 steps in the same sequence. For example, with reference to the travel experience example discussed above, virtual-world server 150 may determine that at least a threshold number 176 of users selected a travel destination, then selected a flight using a first virtual portal, and finally selected a hotel using a second virtual portal. In one embodiment, this reduced sequence of steps 174 may be designated as the minimum sequence set 178.

Once the minimum sequence set 178 of steps 174 has been determined, virtual-world server 150 automatically presents the determined minimum sequence set 178 to users (e.g., first user 110) subsequently requesting to perform the particular task 172. For example, when the minimum sequence set 178 associated with a travel experience includes selecting a travel destination, selecting a flight using a first virtual portal, and selecting a hotel using a second virtual portal, virtual-world server 150 may present this same minimum sequence set 178 of steps 174 to other users (e.g., first user 110) desiring to obtain a travel experience.

The threshold 176 used to determine the most popular sequence of steps for completing the particular task 172 may be same or different from the threshold 176 used to determine the minimum sequence set 178 in relation to completing the particular task 172. When both thresholds 176 are the same, the minimum sequence set 178 of steps 174 may be the most popular sequence of steps 174, assuming that only one sequence of steps 174 equaled or exceeded the threshold 176.

As discussed above, by presenting a pre-decided sequence of steps 174 (e.g., the minimum sequence set 178 of steps 174) to users (e.g., first user 110), virtual-world server 150 saves the users from the burden of making several decisions relating to selection of options and alternatives at one or more steps while performing the particular task 172. This improves time taken to complete the particular task 172 and completion statistics associated with the particular task 172. Further, by presenting the minimum number of steps 174 followed by most users to complete the particular task 172, virtual-world server 150 further improves the speed of completing the particular task 172. In cases where the minimum sequence set 178 is same as the most popular sequence of steps 174, virtual-world server 150 improves the likelihood that most users who are presented with the sequence of steps 174 are satisfied with the particular selection of options and alternatives associated with the presented sequence of steps 174 in relation to the particular task 172. In addition, as the particular steps and the sequence of the steps 174 to be presented to the first user 110 is known, the virtual-world server 150 may need to load on the first user device 104 only those steps that are part of the particular sequence of steps and no other steps, options and/or alternatives. Further, since the particular sequence of steps 174 to be loaded onto the first user device 104 is known beforehand, the virtual-world server 150 may access from the memory 156 metadata 180 related to the steps 174 that are part of the particular sequence of steps and transmit the metadata 180 to the first user device 104 for use in rendering on the first user device 104, thus improving speed of rendering at the first user device 104. This may save computing resources (e.g., processing, memory, network bandwidth etc.) which would otherwise be needed to access from the memory 156 metadata associated with all alternative options and/or sub-steps associated with each step, transmit all the metadata to the first user device 104 and render all the alternative options and/or sub-steps on the first user device 104. Thus, the above technique may improve processing efficiency at the virtual-world server 150 as well as the first user device 104.

In one or more embodiments, one or more steps 174 that are part of the most popular sequence of steps 174 and/or the minimum sequence set 178 of steps 174 may be provided in the virtual environment 102 by different entities. For example, a first step 174 from the set may be provided by a first entity 122 and a second step 174 from the set may be provided by a second entity 124. This may mean that the first user 110 may need to engage in separate interaction sessions with the first entity 122 and the second entity 124 to perform the first step 174 and the second step 174 respectively. For example, the first user 110 may need to access a first virtual portal in the virtual environment 102 operated by the first entity 122 to perform the first step 174 and access a second virtual portal in the virtual environment 102 operated by the second entity 124 to perform the second step 174. Before performing the respective first and second steps, both the first entity 122 and the second entity 124 may require the first user 110 to authenticate an identity of the first user 110 using user credentials registered for the first user 110 with the respective entities. For example, the first user 110 may have previously registered with the first entity 122 and generated a first user credential that provides the first user 110 access to the first virtual portal. Similarly, the first user 110 may have previously registered with the second entity 124 and generated a second user credential that provides the first user 110 access to the second virtual portal. Virtual-world server 150 may be configured to store the first user credential associated with the first entity 122 and the second user credential associated with the second entity 124 as part of the user profile 168 of the first user 110. When the first user 110 requests to perform the particular task 172, the virtual-world server 150 knows that the sequence of steps to be presented to the first user 110 includes the first step provided by the first entity 122 and the second step provided by the second entity 124. Virtual-world server 150 may automatically access the user profile 168 of the first user 110, obtain the first and second user credentials, and pre-authorize the first user with the first entity 122 and the second entity 124 based on the respective first and second user credentials. This saves the first user 110 the additional steps of signing on to the first and second virtual portals using the respective first and second user credentials while completing the particular task 172. Since the first user 110 is pre-authorized before initiating the first and second steps, the first user 110 can directly proceed to performing the first and second steps using the respective first and second virtual portals without the additional burden of authorizing with each of the respective first and second entities. This again improves the speed of processing the particular task 172 and overall performance of the virtual-world server 150 and the first user device 104.

Assist a User to Perform a Task in the Virtual Environment

Virtual-world server 150 may be configured to provide one or more assistive features 186 that may help a user (e.g., first user 110) in performing a particular task 172 in the virtual environment 102. As shown in FIG. 1, virtual-world server 150 may store a plurality of assistive features 186 including, but not limited to, audible narration 187, text narratives 188, object repositioning 189 and sign language narration 190. In one embodiment, each of the assistive features 186 is a software program designed to provide a particular type of assistance to the first user 110 as described below. For example, audible narration 187 may be designed to audibly narrate a scene 182 rendered on a user device (e.g., first user device 104) and/or one or more visual elements rendered as part of the scene 182. Text narratives 188 may be designed to display text narratives describing a scene 182 rendered on a user device (e.g., first user device 104) and/or one or more visual elements rendered as part of the scene 182. Object repositioning 189 may be designed to reposition one or more visual elements rendered as part of the scene 182 on a user device (e.g., first user device 104). Sign-language narration 190 may be designed to describe using sign-language a scene 182 rendered on a user device (e.g., first user device 104) and/or one or more visual elements rendered as part of the scene 182. In certain embodiments, the assistive features 186 may be particularly useful for users having certain disabilities (e.g., physical and/or cognitive disabilities). For example, audible narration 187 may help users who are partially or fully blind. Text narratives 188 may be help users with hearing disability. Object repositioning 189 may help users with physical disabilities. Sign-language narration 190 may help users with hearing disabilities and/or speaking disabilities. It may be noted that one or more of the assistive features 186 may be useful for users with no disabilities. For example, text narratives 188 may be used to add closed captioning to a scene 182 (e.g., an audio clip or video clip playing within the scene 182) in a language that the first user 110 understands.

It may be noted that while embodiments of the present disclosure are discussed with reference to certain example assistive features 186, a person having ordinary skill in the art may appreciate that the disclosed embodiments apply to other assistive features designed to assist a user (e.g., first user 110) in the virtual environment 102.

Virtual environment 102 may be made up of a plurality of scenes 182 that are displayed to the first user 110 (e.g., rendered on the first user device 104) in a particular sequence. A scene 182 of the virtual environment 102 may include a unique combination of a plurality of visual elements including, but not limited to, buildings, trees, vehicles, avatars, objects, and virtual controls. In certain embodiments, a scene 182 associated with the virtual environment 102 may be analogous to a frame of a video clip that includes a plurality of frames playing in a sequence. FIG. 1 shows an example scene 182 of the virtual environment 102. A particular scene 182 of the virtual environment 102 rendered on the first user device 104 may depend on an operation being performed by the first user 110. For example, when performing a particular task 172, the sequence of steps 174 performed by the first user 110 determine which scenes 182 are displayed to the first user 110 and in what sequence. Each step 174 of the particular task 172 may include one or more scenes 182. For example, when the task 172 includes obtaining a travel experience, a first scene 182 associated with the step of selecting a travel destination may include a plurality of images representing a list of travel destinations and one or more virtual controls allowing the first user 110 to select a particular travel destination from the list.

In one or more embodiments, virtual-world server 150 may be configured to store scene properties 184 associated with each scene 182 to be rendered on the first user device 104, for example, as part of performing one or more steps 174 associated with a particular task 172 in the virtual environment 102. Scene properties 184 associated with each scene 182 of the virtual environment 102 may include a description of the scene 182 including a description of each visual element and/or audio element that is part of the scene 182 and the arrangement of the visual elements in the scene 182. A description of a visual element included in the scene may include, but is not limited to, a description of a color scheme, patterns, size, dimensions, function, and position relative to other visual elements in the scene 182. Each of the assistive features 186 may be configured to generate a respective assistance relating to a particular scene 182 based on the scene properties 184 associated with the scene 182. For example, audible narration 187 may invoke the scene properties 184 related to a particular scene 182 and build audible narrations related to the particular scene 182 based on the description of the scene 182 in the scene properties 184.

Virtual-world server 150 may be configured to intelligently determine whether the first user 110 needs one or more assistive features 186 when performing steps 174 associated with a particular task 172 in the virtual environment 102. As described in more detail below, virtual-world server 150 may be configured to present one or more assistive features to the first user 110 based on non-responsiveness of the first user 110 in relation to a scene 182 presented to the first user.

Once the virtual-world server 150 authorizes the first user 110 (e.g., using first avatar 114) to enter the virtual environment 102 based on the user credential 166 received from the first user 110, the first user 110 may request the virtual-world server 150 to perform a particular task 172 in the virtual environment 102. For example, the first user 110 may request to obtain/select a travel experience in the virtual environment 102. In response to receiving the request to perform the particular task 172 from the first user 110, virtual-world server 150 may be configured to present (e.g., render and display on the first user device 104) a first scene 182 associated with a first step 174 to be performed by the first user 110 as part of completing the particular task 172 in the virtual environment. Virtual-world server 150 may be configured to determine whether an actionable response was received from the first user 110 after presenting the first scene 182 on the first user device 104. For example, virtual-world server 150 may be configured to determine whether an input command was received from the first user 110 within a threshold time period 181 after presenting the first scene 182. A lack of response from the first user 110 may be indicative that the first user 110 needs assistance in understanding the first scene 182 and/or providing a response to the first scene 182. In response to determining that a response (e.g., input command) has not been received from the first user 110 within the threshold time period 181 after presenting the first scene 182, virtual-world server 150 invokes one or more assistive features 186 and presents the one or more assistive features 186 to the first user 110. For example, virtual-world server 150 may generate the one or more assistive features 186 associated with the first scene 182 and then present the first scene (e.g., revised first scene) including the generated one or more assistive features. The one or more assistive features 186 presented to the first user 110 may help the first user 110 to understand the first scene 182 and/or provide an appropriate response. Thus, virtual-world server 150 may receive a response (e.g., an input command) from the first user 110 after presenting the revised first scene 182 to the first user 110. Virtual-world server 150 may process the first step 174 based on the input command received from the first user 110.

Virtual-world server 150 may be configured to determine which one of the assistive features to present to the first user 110 based on the type of scene 182 presented to the first user 110 and/or a type of response expected from the first user 110. In one embodiment, virtual-world server 150 may be configured to determine to present to the first user 110 an audible narration 187 of a scene 182 or portions thereof. For example, the first scene 182 presented to the first user 110 may include visual elements such as a visual representation of a plurality of travel destinations and visual controls to select one or more of the displayed travel destinations. In this case, when virtual-world server 150 does not receive a selection of a travel destination from the first user 110 within a pre-configured threshold time period 181 after presenting the first scene 182 to the first user 110, it may be indicative that the first user 110 may vision impaired (e.g., partially or fully blind). Thus, when virtual-world server 150 does not receive a selection of a travel destination (or any other input command) from the first user 110 within a pre-configured threshold time period 181 after presenting the first scene 182 to the first user 110, virtual-world server 150 may invoke the audible narration 187 software program. The audible narration 187 program may access the scene properties 184 associated with the first scene 182 and generate an audible narration of the first scene 182 or portions thereof (e.g., one or more visual elements in the first scene 182) using the description of the first scene 182 in the scene properties 184. The virtual-world server 150 then re-renders the first scene 182 with the generated audible narration and presents a revised first scene 182 including the audible narration of the first scene 182 or portions thereof.

In one embodiment, virtual-world server 150 may be configured to determine to present to the first user 110 text narratives 188 related to a scene 182 or portions thereof. For example, the first scene 182 presented to the first user 110 may include audible descriptions of certain travel destinations and/or other audio content providing information relating to certain travel destinations. In this case, when virtual-world server 150 does not receive a selection of a travel destination (or any other input command) from the first user 110 within a pre-configured threshold time period 181 after presenting the first scene 182 including the audio content to the first user 110, it may be indicative that the first user 110 may have a hearing disability and/or does not understand the audio content (e.g., does not understand the accent, language etc.). Thus, when virtual-world server 150 does not receive a selection of a travel destination (or any other input command) from the first user 110 within a pre-configured threshold time period 181 after presenting the first scene 182 to the first user 110, virtual-world server 150 may invoke the text narratives 188 software program. The text narratives 188 program may translate the audio content included in the first scene 182 and generate text narratives associated with the audio content. In one embodiment, the user profile 168 of the first user 110 may store a preferred language of the first user 110. The text narratives 188 program may generate the text narratives in the preferred language of the first user 110. Additionally or alternatively, the text narratives 188 program may access the scene properties 184 associated with the first scene 182 and generate text narration of the visual elements included in the first scene 182 or portions thereof using the description of the first scene 182 in the scene properties 184. The virtual-world server 150 may then re-render the first scene 182 with the generated text narratives and present a revised first scene 182 including the text narratives associated with the first scene 182 or portions thereof.

In one embodiment, virtual-world server 150 may be configured to determine to present to the first user 110 a scene 182 or portions thereof with one or more visual elements repositioned within the scene 182. For example, the first scene 182 presented to the first user 110 may include visual elements such as a visual representation of a plurality of travel destinations and visual controls to select one or more of the displayed travel destinations positioned on the right side of the scene. In this case, when virtual-world server 150 does not receive a selection of a travel destination from the first user 110 within a pre-configured threshold time period 181 after presenting the first scene 182 to the first user 110, it may be indicative that the first user 110 may have a disability (physical or cognitive disability) that may not allow the first user 110 to operate on the right side of a display screen associated with the first user device 104. Thus, when virtual-world server 150 does not receive a selection of a travel destination (or any other input command) from the first user 110 within a pre-configured threshold time period 181 after presenting the first scene 182 to the first user 110, virtual-world server 150 may invoke the object repositioning 189 software program. The object repositioning 189 program may access the scene properties 184 associated with the first scene 182 and reposition one or more visual elements (e.g., virtual controls) in the first scene 182 to the left side of the first scene 182 using the description of the first scene 182 in the scene properties 184. The virtual-world server 150 then re-renders the first scene 182 with the repositioned visual elements and presents a revised first scene 182 to the first user 110 on the first user device 104.

In one embodiment, virtual-world server 150 may be configured to determine to present to the first user 110 sign language narratives 190 related to a scene 182 or portions thereof. For example, the first scene 182 presented to the first user 110 may include audible descriptions of certain travel destinations and/or other audio content providing information relating to certain travel destinations. Additionally or alternatively, the first scene 182 may require the first user 110 to verify identity and/or select a travel destination via a voice command. In this case, when virtual-world server 150 does not receive a selection of a travel destination (or any other input command) from the first user 110 within a pre-configured threshold time period 181 after presenting the first scene 182 including the audio content to the first user 110, it may be indicative that the first user 110 may have a hearing disability and/or speaking disability. Thus, when virtual-world server 150 does not receive a selection of a travel destination (or any other input command such as voice command) from the first user 110 within a pre-configured threshold time period 181 after presenting the first scene 182 to the first user 110, virtual-world server 150 may invoke the sign-language narration 190 software program. The sign-language narration 190 program may translate the audio content included in the first scene 182 and generate sign-language narration associated with the audio content. Additionally or alternatively, the sign-language narration 190 program may access the scene properties 184 associated with the first scene 182 and generate sign-language narration of the visual elements included in the first scene 182 or portions thereof using the description of the first scene 182 in the scene properties 184. The virtual-world server 150 may then re-render the first scene 182 with the generated sign-language narration and present a revised first scene 182 including the sign-language narration associated with the first scene 182 or portions thereof.

In one or more embodiments, when the virtual-world server 150 does not receive a response such as an input command from the first user 110 within a pre-configured threshold time period 181 after presenting the first scene 182 to the first user 110, the virtual-world server may be configured to turn on a plurality of assistive features (e.g., all assistive features) and re-render the first scene 182 with the generated plurality of assistive features and present a revised first scene 182 including the plurality of assistive features. The virtual-world server 150 provides the first user 110 means (e.g., controls) to selectively switch off one or more of the assistive features. It is then up to the first user 110 to turn off assistive features that the first user 110 does not need and keep other assistive on for subsequent scenes 182.

In an additional or alternative embodiment, virtual-world server 150 may be configured to present a first scene 182 associated with a first step 174 of a sequence of steps 174 (e.g., minimum sequence set 178) with a plurality of assistive features 186 by default. For example, virtual-world server 150 may be configured to present audible narrations 187 as well as text narratives 188 in the first scene 182. The virtual-world server 150 provides the first user 110 means (e.g., controls) to selectively switch off one or more of the presented assistive features 186. It is then up to the first user 110 to turn off assistive features that the first user 110 does not need and keep other assistive on for subsequent scenes 182. Virtual-world server 150 may be configured to present scenes 182 associated with subsequent steps 174 in the sequence of steps 174 with assistive features 186 not turned off by the first user 110. For example, when the first user 110 turns off audible narration 187 but does not turn off text narratives in the first scene 182, virtual-world server 150 may render subsequent scenes 182 associated with subsequent steps 174 with the text narratives 188.

In one or more embodiments, virtual-world server 150 may be configured to not render assistive features 186 that are rendered on the first user device 104 on other user devices (e.g., second user device 106) operated by other users (e.g., second user 112) sharing the same virtual space in the virtual environment 102 and/or interacting with the first user 110 in the virtual environment 102. This helps preserve user privacy. For example, when the first user 110 and the second user 112 are in a virtual interaction session within the virtual environment 102 and virtual-world server 150 turns on text narratives 188 for the first user 110, virtual-world server 150 presents the text narratives 188 on the first user device 104 only and does not present the same text narratives 188 on the second user device 106. This allows a potential disability of the first user 110 to be hidden from the second user 112 and protects the privacy of the first user 110.

Since the particular sequence of steps 174 to be loaded onto the first user device 104 is known beforehand, the virtual-world server 150 may access from the memory 156 scene properties 184 related to one or more subsequent steps 174 that are part of the particular sequence of steps and generate the assistive features 186 before a scene 182 is rendered on the first user device 104 thus improving speed of rendering at the first user device 104. This may save computing resources (e.g., processing, memory, network bandwidth etc.) which would otherwise be needed to access from the memory 156 scene properties 184 associated with all alternative options and/or sub-steps associated with each step and generate the assistive features 186 after the first user 110 has selected a particular option at each step. Thus, the above technique may improve processing efficiency at the virtual-world server 150 as well as the first user device 104.

FIG. 3 illustrates a flowchart of an example method 300 for performing a task 172 in a virtual environment 102, in accordance with one or more embodiments of the present disclosure. Method 300 may be performed by the virtual-world server 150 shown in FIG. 1.

At operation 302, virtual-world server 150 monitors a set of steps 174 performed by each of a plurality of users to complete a first task 172 in a virtual environment 102, wherein at least two or more users of the plurality of users perform a different set of steps 174 to complete the first task 172.

As described above, virtual-world server 150 may store several tasks 172 that may be performed by users (e.g., first user 110) in the virtual environment 102. Each task 172 may include a plurality of steps 174 that the first user 110 may perform to complete the task 172. A particular task 172 may be completed by taking multiple alternative paths including performing multiple alternative sequence of steps 174, wherein each alternative sequence of steps 174 may include a different set of steps 174 performed in a particular sequence. In some embodiments, two alternative sequence of steps 174 may include the same set of steps 174 performed in a different sequence. In this context, each step 174 associated with a particular task 172 may include several alternative options and/or alternative sub-steps that may be selected and/or performed respectively by the first user 110. Each alternative option or sub-step selected by the first user 110 at a particular step 174 while performing a particular task 172 may take the first user 110 down a different path to completing the particular task 172. For example, virtual-world server 150 may store a plurality of steps 174 with regard to obtaining a travel experience in the virtual environment 102. The steps 174 may include but are not limited to, selecting a travel destination, selecting a mode of transport, selecting a hotel, selecting a restaurant, selecting an activity at the desired destination, and selecting a method to transfer data objects (e.g., virtual data objects 162) to one or more entities providing these travel product/services in the virtual environment 102. The virtual-world server 150 may further store alternative options or sub-steps associated with one or more of these steps 174. For example, alternative options relating to the step 174 of selecting a mode of transport may include alternative transport options including flights, trains, buses, cars etc. Further, the alternative options may include using alternative virtual portals to select one or more of the transport options. Similarly, alternative options relating to the step 174 of selecting a hotel may include using alternative virtual portals to select a hotel at the desired travel destination. A selection of a particular alternative option at a particular step typically decides the next one or more steps 174 that may be followed by the first user 110 to complete the task 172 of obtaining the travel experience.

Virtual-world server 150 may be configured to monitor a set of steps 174 performed by each of a plurality of users (e.g., first user 110, second user 112 etc.) for completing a particular task 172.

At operation 304, virtual-world server 150 determines that at least a threshold number 176 of users of the plurality of users completed the first task 172 in the virtual environment 102 by performing a particular set of steps 174 in a particular sequence.

As described above, based on the sets of steps 174 performed by a plurality of users to complete the same particular task 172, virtual-world server 150 may be configured to determine a pattern relating to the steps 174 followed to complete the particular task 172 and the sequence in which the steps 174 were performed while completing the particular task 172. For example, virtual-world server 150 may be configured to determine when several users follow the same steps 174 in the same sequence to complete the particular task 172. When a certain number of users (e.g., equaling or exceeding a pre-set threshold number 176) perform the same steps 174 in the same sequence for completing a particular task 172, it is indicative that the sequence of steps 174 is popular among users and that most users are likely to follow this same sequence of steps 174 to complete the particular task 172.

In one or more embodiments, virtual-world server 150 may be configured to compare the sets of steps 174 performed by each user of a plurality of users to complete the same particular task 172. Each time a user performs a particular sequence of steps 174 that was previously performed by one or more other users to complete the particular task 172, virtual-world server 150 increments a numerical indicator (e.g., a numerical counter) associated with that particular sequence of steps 174, wherein the numerical indicator represents a number of times the same sequence of steps 174 was performed by users to complete the particular task 172. When the numerical indicator associated with a particular sequence of steps 174 equals or exceeds a threshold 176 number, virtual-world server 150 determines the particular sequence of steps 174 is the most popular sequence of steps in relation to completing the particular task 172. In one embodiment, when numerical indicators associated with two or more sequence of steps equal or exceed the threshold 176 number, virtual-world server 150 determines the sequence of steps 174 with the highest assigned numerical indicator as the most popular sequence of steps 174 in relation to completing the particular task 172.

At operation 306, virtual-world server 150 receives a user credential 166 associated with a first user 110, wherein the user credential 166 provides the first user 110 access to the virtual environment 102.

At operation 308, virtual-world server 150 checks whether the user credential 166 is registered at the virtual-world server 150 to provide the first user 110 access to the virtual environment 102. For example, the virtual environment 102 may be owned and/or managed by a first entity. In this case, the first user 110 may need to be registered with the first entity to gain access to the virtual environment 102. If the first user 110 is registered with the first entity, this registration may be stored at the virtual-world server 150 including the user credential 166 that was registered with the first entity to gain access to the virtual environment 102. If the first user 110 is found to be not authorized to access the virtual environment 102 based on the user credential 166, method 300 proceeds to operation 310 where the virtual-world server 150 denies the first user 110 access to the virtual environment 102. On the other hand, if the first user 110 is found to be authorized to access the virtual environment 102, method 300 proceeds to operation 312, where the virtual-world server 150 authorizes, an avatar (e.g., first avatar 114) of the first user 110 to enter the virtual environment 102.

As described above, virtual-world server 150 may be configured to use the user credential 166 collected from the first user 110, generated by the first user 110 or assigned to the first user 110 during real-world data interactions with the first user 110, to verify identity of the first user 110 in the virtual environment 102. Thus, the user credential 166 provides the first user 110 access to the virtual environment 102. For example, the user credential 166 may be used by the virtual-world server 150 to verify that the first avatar 114 belongs to and is controlled by the first user 110.

In one example, user credential 166 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 166) as part of registering with the real-world server 130 and use the separate user credential to log into the real-world server 130 and perform real-world data interactions. The first user 110 may separately generate the user credential 166 as part of registering with the virtual-world server 150 (e.g., including registering with a first entity that owns and/or manages the virtual environment 102), for example, during a real-world data interaction with the real-world server 130. Once the first user 110 has registered with the virtual-world server 150 and generated the user credential 166, the first user 110 may use the user credential 166 to log into the virtual-world server 150, gain access to the virtual environment 102 and perform virtual-world data interactions in within the virtual environment 102.

Additionally or alternatively, based on monitoring the sets of steps 174 performed by the plurality of users to complete the particular task 172, virtual-world server 150 may be configured to further determine a minimum sequence set 178 that can be performed to complete the particular task 172. In one embodiment, the minimum sequence set 178 includes a minimum number of steps 174 that were performed by a threshold number (e.g., threshold 176) of users in a particular sequence to complete the particular task 172. The minimum sequence set 178 indicates that one or more steps that are not part of the minimum sequence set 178 were not performed by at least a threshold 176 number of users. This in turn indicates that steps not included in the minimum sequence set 178 may be optional and/or unimportant for at least the threshold number 176 of users in relation to completing the particular task 172. The sequence of steps 174 in the minimum sequence set 178 may be same or different from the most popular sequence of steps 174 that was performed by most users to complete the particular task 172. In one or more embodiments, virtual-world server 150 may be configured to assign a pattern indicator 170 to each instance of completing the particular task 172 by a user based on a number of steps performed by the user to complete the particular task 172. In one or more embodiments, the pattern indicator 170 may be a numerical value (e.g., 0-10, 0-100 etc.), wherein the virtual-world server 150 may be configured to assign the pattern indicator 170 having a higher numerical value to an instance of completing the particular task 172 when a lower number of steps were performed by the user to complete the particular task 172. Thus, instances of completing the particular task 172 with lower number of steps 174 are assigned a pattern indicator 170 having a higher numerical value than instances of completing the particular task 172 with a higher number of steps 174.

Virtual-world server 150 may be configured to group together all instances of completing the particular task 172 having the highest assigned numerical values of the pattern indicator 170. For example, when the numerical value of the pattern indicator 170 ranges from 0-100, virtual-world server 150 may group together all instances of completing the particular task 172 that were assigned a pattern indicator value of 80, wherein no instance was assigned a pattern indicator 170 higher than 80. In one embodiment, all instances that are assigned the same numerical value of the pattern indicator 170 may have completed the particular task 172 by performing the same number of steps. For example, all instances of completing the particular task 172 having the pattern indicator value of 80 may have been completed the particular task 172 by performing 3 steps. Thus, in this case all instances of completing the particular task 172 by performing 3 steps are grouped together in a single group. To determine the minimum sequence set 178, virtual-world server 150 may be configured to compare the sets of steps 174 corresponding to each instance of completing the particular task 172 in the group. Following the above example, virtual-world server 150 may compare the sets of 3 steps associated with each instance from the group. Virtual-world server 150 may be configured to determine a particular sequence of steps 174 from the group as the minimum sequence set 178 when at least a threshold number 176 of instances from the group include performing the same steps in the same sequence. Following the above example, virtual-world server 150 may be configured to determine a particular sequence of 3 steps from the group as the minimum sequence set 178 when at least a threshold number 176 of instances from the group include performing the same 3 steps in the same sequence. For example, with reference to the travel experience example discussed above, virtual-world server 150 may determine that at least a threshold number 176 of users selected a travel destination, then selected a flight using a first virtual portal, and finally selected a hotel using a second virtual portal.

At operation 314, virtual-world server 150 receives from the first user device 104 a request from the first user 110 to perform the first task 172 in the virtual environment 102.

At operation 316, virtual-world server 150, in response to receiving the request to perform the first task 172, presents to the first user 110 in the virtual environment 102 the determined particular set of steps 174 in the determined particular sequence.

At operation 318, virtual-world server 150 processes the particular set of steps 174 in the particular sequence when performed by the first user 110 to complete the first task 172 in the virtual environment 102.

As described above, once a most popular sequence of steps 174 has been determined, virtual-world server 150 automatically presents the determined most popular sequence of steps 174 to users (e.g., first user 110) subsequently requesting to perform the particular task 172. For example, with regard to a travel experience, virtual-world server 150 may determine that most users select a travel destination, select a flight using a first virtual portal, and select a hotel using a second virtual portal. In response to determining this popular sequence of steps 174 associated with obtaining a travel experience, virtual-world server 150 may present this same sequence of steps 174 to other users (e.g., first user 110) desiring to obtain a travel experience.

Similarly, once a reduced (e.g., minimum) sequence set 178 of steps 174 has been determined, virtual-world server 150 automatically presents the determined minimum sequence set 178 to users (e.g., first user 110) subsequently requesting to perform the particular task 172. For example, when the minimum sequence set 178 associated with a travel experience includes selecting a travel destination, selecting a flight using a first virtual portal, and selecting a hotel using a second virtual portal, virtual-world server 150 may present this same minimum sequence set 178 of steps 174 to other users (e.g., first user 110) desiring to obtain a travel experience.

FIG. 4 illustrates a flowchart of an example method 400 for assisting a user in performing a task 172 in a virtual environment 102, in accordance with one or more embodiments of the present disclosure. Method 400 may be performed by the virtual-world server 150 shown in FIG. 1.

At operation 402, virtual-world server 150 receives a user credential 166 associated with a first user 110, wherein the user credential 166 provides the first user 110 access to a virtual environment 102.

At operation 404, virtual-world server 150 checks whether the user credential 166 is registered at the virtual-world server 150 to provide the first user 110 access to the virtual environment 102. For example, the virtual environment 102 may be owned and/or managed by a first entity. In this case, the first user 110 may need to be registered with the first entity to gain access to the virtual environment 102. If the first user 110 is registered with the first entity, this registration may be stored at the virtual-world server 150 including the user credential 166 that was registered with the first entity to gain access to the virtual environment 102. If the first user 110 is found to be not authorized to access the virtual environment 102 based on the user credential 166, method 400 proceeds to operation 406 where the virtual-world server 150 denies the first user 110 access to the virtual environment 102. On the other hand, if the first user 110 is found to be authorized to access the virtual environment 102, method 400 proceeds to operation 408, where the virtual-world server 150 authorizes, an avatar (e.g., first avatar 114) of the first user 110 to enter the virtual environment 102.

As described above, virtual-world server 150 may be configured to use the user credential 166 collected from the first user 110, generated by the first user 110 or assigned to the first user 110 during real-world data interactions with the first user 110, to verify identity of the first user 110 in the virtual environment 102. Thus, the user credential 166 provides the first user 110 access to the virtual environment 102. For example, the user credential 166 may be used by the virtual-world server 150 to verify that the first avatar 114 belongs to and is controlled by the first user 110.

In one example, user credential 166 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 166) as part of registering with the real-world server 130 and use the separate user credential to log into the real-world server 130 and perform real-world data interactions. The first user 110 may separately generate the user credential 166 as part of registering with the virtual-world server 150 (e.g., including registering with a first entity that owns and/or manages the virtual environment 102), for example, during a real-world data interaction with the real-world server 130. Once the first user 110 has registered with the virtual-world server 150 and generated the user credential 166, the first user 110 may use the user credential 166 to log into the virtual-world server 150, gain access to the virtual environment 102 and perform virtual-world data interactions in within the virtual environment 102.

At operation 410, virtual-world server 150 receives from the first user device 104 a request from the first user 110 to perform a first task 172 in the virtual environment 102.

As described above, virtual-world server 150 may store several tasks 172 that may be performed by users (e.g., first user 110) in the virtual environment 102. Each task 172 may include a plurality of steps 174 that the first user 110 may perform to complete the task 172. A particular task 172 may be completed by taking multiple alternative paths including performing multiple alternative sequence of steps 174, wherein each alternative sequence of steps 174 may include a different set of steps 174 performed in a particular sequence. In some embodiments, two alternative sequence of steps 174 may include the same set of steps 174 performed in a different sequence. In this context, each step 174 associated with a particular task 172 may include several alternative options and/or alternative sub-steps that may be selected and/or performed respectively by the first user 110. Each alternative option or sub-step selected by the first user 110 at a particular step 174 while performing a particular task 172 may take the first user 110 down a different path to completing the particular task 172. For example, virtual-world server 150 may store a plurality of steps 174 with regard to obtaining a travel experience in the virtual environment 102. The steps 174 may include but are not limited to, selecting a travel destination, selecting a mode of transport, selecting a hotel, selecting a restaurant, selecting an activity at the desired destination, and selecting a method to transfer data objects (e.g., virtual data objects 162) to one or more entities providing these travel product/services in the virtual environment 102. The virtual-world server 150 may further store alternative options or sub-steps associated with one or more of these steps 174. For example, alternative options relating to the step 174 of selecting a mode of transport may include alternative transport options including flights, trains, buses, cars etc. Further, the alternative options may include using alternative virtual portals to select one or more of the transport options. Similarly, alternative options relating to the step 174 of selecting a hotel may include using alternative virtual portals to select a hotel at the desired travel destination. A selection of a particular alternative option at a particular step typically decides the next one or more steps 174 that may be followed by the first user 110 to complete the task 172 of obtaining the travel experience.

At operation 412, virtual-world server 150 presents a first scene 182 to the first user 110 in the virtual environment 102, wherein the first scene 182 is associated with a first step 174 to be performed by the first user 110 in the virtual environment 102 as part of completing the first task 172.

As described above, virtual environment 102 may be made up of a plurality of scenes 182 that are displayed to the first user 110 (e.g., rendered on the first user device 104) in a particular sequence. A scene 182 of the virtual environment 102 may include a unique combination of a plurality of visual elements including, but not limited to, buildings, trees, vehicles, avatars, objects, and virtual controls. In certain embodiments, a scene 182 associated with the virtual environment 102 may be analogous to a frame of a video clip that includes a plurality of frames playing in a sequence. FIG. 1 shows an example scene 182 of the virtual environment 102. A particular scene 182 of the virtual environment 102 rendered on the first user device 104 may depend on an operation being performed by the first user 110. For example, when performing a particular task 172, the sequence of steps 174 performed by the first user 110 determine which scenes 182 are displayed to the first user 110 and in what sequence. Each step 174 of the particular task 172 may include one or more scenes 182. For example, when the task 172 includes obtaining a travel experience, a first scene 182 associated with the step of selecting a travel destination may include a plurality of images representing a list of travel destinations and one or more virtual controls allowing the first user 110 to select a particular travel destination from the list.

At operation 414, determines that the first user 110 has not responded to the presentation of the first scene 182 for a threshold time period 181.

At operation 416, virtual-world server 150 in response to determining that the first user 110 has not responded, obtains one or more assistive features 186 associated with the first scene 182.

As described above, virtual-world server 150 may be configured to provide one or more assistive features 186 that may help a user (e.g., first user 110) in performing a particular task 172 in the virtual environment 102. As shown in FIG. 1, virtual-world server 150 may store a plurality of assistive features 186 including, but not limited to, audible narration 187, text narratives 188, object repositioning 189 and sign language narration 190. In one embodiment, each of the assistive features 186 is a software program designed to provide a particular type of assistance to the first user 110 as described below. For example, audible narration 187 may be designed to audibly narrate a scene 182 rendered on a user device (e.g., first user device 104) and/or one or more visual elements rendered as part of the scene 182. Text narratives 188 may be designed to display text narratives describing a scene 182 rendered on a user device (e.g., first user device 104) and/or one or more visual elements rendered as part of the scene 182. Object repositioning 189 may be designed to reposition one or more visual elements rendered as part of the scene 182 on a user device (e.g., first user device 104). Sign-language narration 190 may be designed to describe using sign-language a scene 182 rendered on a user device (e.g., first user device 104) and/or one or more visual elements rendered as part of the scene 182.

Virtual-world server 150 may be configured to intelligently determine whether the first user 110 needs one or more assistive features 186 when performing steps 174 associated with a particular task 172 in the virtual environment 102. As described in more detail below, virtual-world server 150 may be configured to present one or more assistive features to the first user 110 based on non-responsiveness of the first user 110 in relation to a scene 182 presented to the first user.

Once the virtual-world server 150 authorizes the first user 110 (e.g., using first avatar 114) to enter the virtual environment 102 based on the user credential 166 received from the first user 110, the first user 110 may request the virtual-world server 150 to perform a particular task 172 in the virtual environment 102. For example, the first user 110 may request to obtain/select a travel experience in the virtual environment 102. In response to receiving the request to perform the particular task 172 from the first user 110, virtual-world server 150 may be configured to present (e.g., render and display on the first user device 104) a first scene 182 associated with a first step 174 to be performed by the first user 110 as part of completing the particular task 172 in the virtual environment. Virtual-world server 150 may be configured to determine whether an actionable response was received from the first user 110 after presenting the first scene 182 on the first user device 104. For example, virtual-world server 150 may be configured to determine whether an input command was received from the first user 110 within a threshold time period 181 after presenting the first scene 182. A lack of response from the first user 110 may be indicative that the first user 110 needs assistance in understanding the first scene 182 and/or providing a response to the first scene 182. In response to determining that a response (e.g., input command) has not been received from the first user 110 within the threshold time period 181 after presenting the first scene 182, virtual-world server 150 invokes one or more assistive features 186 from the memory 156

At operation 418, virtual-world server 150 presents the first scene 182 with the one or more assistive features 186.

As described above, in response to determining that a response (e.g., input command) has not been received from the first user 110 within the threshold time period 181 after presenting the first scene 182, virtual-world server 150 invokes one or more assistive features 186 and presents the one or more assistive features 186 to the first user 110. For example, virtual-world server 150 may generate the one or more assistive features 186 associated with the first scene 182 and then present the first scene (e.g., revised first scene) including the generated one or more assistive features. The one or more assistive features 186 presented to the first user 110 may help the first user 110 to understand the first scene 182 and/or provide an appropriate response.

Virtual-world server 150 may be configured to determine which one of the assistive features to present to the first user 110 based on the type of scene 182 presented to the first user 110 and/or a type of response expected from the first user 110. In one embodiment, virtual-world server 150 may be configured to determine to present to the first user 110 an audible narration 187 of a scene 182 or portions thereof. For example, the first scene 182 presented to the first user 110 may include visual elements such as a visual representation of a plurality of travel destinations and visual controls to select one or more of the displayed travel destinations. In this case, when virtual-world server 150 does not receive a selection of a travel destination from the first user 110 within a pre-configured threshold time period 181 after presenting the first scene 182 to the first user 110, it may be indicative that the first user 110 may vision impaired (e.g., partially or fully blind). Thus, when virtual-world server 150 does not receive a selection of a travel destination (or any other input command) from the first user 110 within a pre-configured threshold time period 181 after presenting the first scene 182 to the first user 110, virtual-world server 150 may invoke the audible narration 187 software program. The audible narration 187 program may access the scene properties 184 associated with the first scene 182 and generate an audible narration of the first scene 182 or portions thereof (e.g., one or more visual elements in the first scene 182) using the description of the first scene 182 in the scene properties 184. The virtual-world server 150 then re-renders the first scene 182 with the generated audible narration and presents a revised first scene 182 including the audible narration of the first scene 182 or portions thereof.

In one embodiment, virtual-world server 150 may be configured to determine to present to the first user 110 text narratives 188 related to a scene 182 or portions thereof. For example, the first scene 182 presented to the first user 110 may include audible descriptions of certain travel destinations and/or other audio content providing information relating to certain travel destinations. In this case, when virtual-world server 150 does not receive a selection of a travel destination (or any other input command) from the first user 110 within a pre-configured threshold time period 181 after presenting the first scene 182 including the audio content to the first user 110, it may be indicative that the first user 110 may have a hearing disability and/or does not understand the audio content (e.g., does not understand the accent, language etc.). Thus, when virtual-world server 150 does not receive a selection of a travel destination (or any other input command) from the first user 110 within a pre-configured threshold time period 181 after presenting the first scene 182 to the first user 110, virtual-world server 150 may invoke the text narratives 188 software program. The text narratives 188 program may translate the audio content included in the first scene 182 and generate text narratives associated with the audio content. In one embodiment, the user profile 168 of the first user 110 may store a preferred language of the first user 110. The text narratives 188 program may generate the text narratives in the preferred language of the first user 110. Additionally or alternatively, the text narratives 188 program may access the scene properties 184 associated with the first scene 182 and generate text narration of the visual elements included in the first scene 182 or portions thereof using the description of the first scene 182 in the scene properties 184. The virtual-world server 150 may then re-render the first scene 182 with the generated text narratives and present a revised first scene 182 including the text narratives associated with the first scene 182 or portions thereof.

In one embodiment, virtual-world server 150 may be configured to determine to present to the first user 110 a scene 182 or portions thereof with one or more visual elements repositioned within the scene 182. For example, the first scene 182 presented to the first user 110 may include visual elements such as a visual representation of a plurality of travel destinations and visual controls to select one or more of the displayed travel destinations positioned on the right side of the scene. In this case, when virtual-world server 150 does not receive a selection of a travel destination from the first user 110 within a pre-configured threshold time period 181 after presenting the first scene 182 to the first user 110, it may be indicative that the first user 110 may have a disability (physical or cognitive disability) that may not allow the first user 110 to operate on the right side of a display screen associated with the first user device 104. Thus, when virtual-world server 150 does not receive a selection of a travel destination (or any other input command) from the first user 110 within a pre-configured threshold time period 181 after presenting the first scene 182 to the first user 110, virtual-world server 150 may invoke the object repositioning 189 software program. The object repositioning 189 program may access the scene properties 184 associated with the first scene 182 and reposition one or more visual elements (e.g., virtual controls) in the first scene 182 to the left side of the first scene 182 using the description of the first scene 182 in the scene properties 184. The virtual-world server 150 then re-renders the first scene 182 with the repositioned visual elements and presents a revised first scene 182 to the first user 110 on the first user device 104.

In one embodiment, virtual-world server 150 may be configured to determine to present to the first user 110 sign language narratives 190 related to a scene 182 or portions thereof. For example, the first scene 182 presented to the first user 110 may include audible descriptions of certain travel destinations and/or other audio content providing information relating to certain travel destinations. Additionally or alternatively, the first scene 182 may require the first user 110 to verify identity and/or select a travel destination via a voice command. In this case, when virtual-world server 150 does not receive a selection of a travel destination (or any other input command) from the first user 110 within a pre-configured threshold time period 181 after presenting the first scene 182 including the audio content to the first user 110, it may be indicative that the first user 110 may have a hearing disability and/or speaking disability. Thus, when virtual-world server 150 does not receive a selection of a travel destination (or any other input command such as voice command) from the first user 110 within a pre-configured threshold time period 181 after presenting the first scene 182 to the first user 110, virtual-world server 150 may invoke the sign-language narration 190 software program. The sign-language narration 190 program may translate the audio content included in the first scene 182 and generate sign-language narration associated with the audio content. Additionally or alternatively, the sign-language narration 190 program may access the scene properties 184 associated with the first scene 182 and generate sign-language narration of the visual elements included in the first scene 182 or portions thereof using the description of the first scene 182 in the scene properties 184. The virtual-world server 150 may then re-render the first scene 182 with the generated sign-language narration and present a revised first scene 182 including the sign-language narration associated with the first scene 182 or portions thereof.

At operation 420, virtual-world server 150 detects, after presenting the first scene 182 with the one or more assistive features 186, that the first user 110 has provided an input associated with the first scene 182 using the first user device 104.

At operation 422, virtual-world server 150 processes the first step 174 in the virtual environment 102 based on the input provided by the first user 110.

In one or more embodiments, when the virtual-world server 150 does not receive a response such as an input command from the first user 110 within a pre-configured threshold time period 181 after presenting the first scene 182 to the first user 110, the virtual-world server may be configured to turn on a plurality of assistive features (e.g., all assistive features) and re-render the first scene 182 with the generated plurality of assistive features and present a revised first scene 182 including the plurality of assistive features. The virtual-world server 150 provides the first user 110 means (e.g., controls) to selectively switch off one or more of the assistive features. It is then up to the first user 110 to turn off assistive features that the first user 110 does not need and keep other assistive on for subsequent scenes 182.

In an additional or alternative embodiment, virtual-world server 150 may be configured to present a first scene 182 associated with a first step 174 of a sequence of steps 174 (e.g., minimum sequence set 178) with a plurality of assistive features 186 by default. For example, virtual-world server 150 may be configured to present audible narrations 187 as well as text narratives 188 in the first scene 182. The virtual-world server 150 provides the first user 110 means (e.g., controls) to selectively switch off one or more of the presented assistive features 186. It is then up to the first user 110 to turn off assistive features that the first user 110 does not need and keep other assistive on for subsequent scenes 182. Virtual-world server 150 may be configured to present scenes 182 associated with subsequent steps 174 in the sequence of steps 174 with assistive features 186 not turned off by the first user 110. For example, when the first user 110 turns off audible narration 187 but does not turn off text narratives in the first scene 182, virtual-world server 150 may render subsequent scenes 182 associated with subsequent steps 174 with the text narratives 188.

In one or more embodiments, virtual-world server 150 may be configured to not render assistive features 186 that are rendered on the first user device 104 on other user devices (e.g., second user device 106) operated by other users (e.g., second user 112) sharing the same virtual space in the virtual environment 102 and/or interacting with the first user 110 in the virtual environment 102. This helps preserve user privacy. For example, when the first user 110 and the second user 112 are in a virtual interaction session within the virtual environment 102 and virtual-world server 150 turns on text narratives 188 for the first user 110, virtual-world server 150 presents the text narratives 188 on the first user device 104 only and does not present the same text narratives 188 on the second user device 106. This allows a potential disability of the first user 110 to be hidden from the second user 112 and protects the privacy of the first user 110.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory that stores a user credential associated with a first user, wherein the memory further stores a plurality of assistive features to assist users in performing tasks in the virtual environment; and
a processor communicatively coupled to a first user device associated with the first user and the memory, wherein the processor is configured to:
monitor a set of steps performed by each of a plurality of users to complete a first task in the virtual environment, wherein at least two or more users of the plurality of users perform a different set of steps to complete the first task;
determine that at least a threshold number of users of the plurality of users completed the first task in the virtual environment by performing a particular set of steps in a particular sequence;
receive from the first user device the user credential associated with the first user, wherein the user credential provides the first user access to a virtual environment;
authorize, based on the user credential, a first avatar of the first user to enter the virtual environment;
receive from the first user device a request from the first user to perform the first task in the virtual environment;
in response to receiving the request, access from the memory a first portion of metadata relating to a plurality of steps that can be performed to complete the first task, wherein the first portion relates only to the particular set of steps of the plurality of steps;
transmit, to the first user device, only the first portion of the metadata that relates to the particular set of steps for rendering the particular set of steps on the first user device, wherein transmitting only the first portion of the metadata causes the first user device to render only the particular set of steps from the plurality of steps;
present a first scene to the first user in the virtual environment, wherein the first scene is associated with a first step to be performed by the first user in the virtual environment as part of completing the first task;
determine that the first user has not responded to the presentation of the first scene for a threshold time period;
in response to determining that the first user has not responded, obtain one or more assistive features associated with the first scene;
present the first scene with the one or more assistive features;
detect, after presenting the first scene with the one or more assistive features, that the first user has provided an input associated with the first scene using the first user device; and
process the first step in the virtual environment based on the input provided by the first user.

2. The system of claim 1, wherein the processor is further configured to:
- present a second scene with a plurality of assistive features associated with the second scene by default;
- detect that the first user has turned off a first assistive feature of the plurality of assistive features;
- detect that the first user has not turned off a second assistive feature of the plurality of assistive features; and
- in response to detecting that the first user has not turned off the second assistive feature, determine that the first user suffers with a disability associated with the second assistive feature; and
- in response to determining that the first user suffers with the disability, present subsequent scenes associated with completing the first task to the first user with the second assistive feature.

3. The system of claim 1, wherein:
the one or more assistive features comprises audible narration of the first scene;
the memory stores properties associated with one or more visual elements to be displayed as part of the first scene in the virtual environment; and
the processor is further configured to:
- determine that an input command has not been received from the first user device within the threshold time period after presenting the first scene;
- in response to determining that the input command has not been received from the first user device, generate audible narration of the one or more visual elements in the first scene based on the properties associated with the one or more visual elements; and
- present the first scene on the first device with the audible narration of the one or more visual elements.

4. The system of claim 1, wherein:
the one or more assistive features comprises text narratives associated with the first scene;
the memory stores properties associated with one or more visual elements to be displayed as part of the first scene in the virtual environment; and
the processor is further configured to:
- determine that an input command has not been received from the first user device within the threshold time period after presenting the first scene;
- in response to determining that the input command has not been received from the first user device, generate text narratives of the one or more visual elements in the first scene based on the properties associated with the one or more visual elements; and
- present the first scene on the first device with the text narratives of the one or more visual elements.

5. The system of claim 1, wherein:
the one or more assistive features comprises repositioning of visual elements within the first scene;
wherein the processor is further configured to:
- determine no input or less input by the first user originating from a portion of the first scene as compared to a remaining portion of the first scene;
- in response to determining no input or less input by the first user originating from a portion of the first scene, configure the first scene by repositioning visual elements from the portion of the first scene to the remaining portion of the first scene; and
- present the first scene on the first user device with the repositioned visual elements.

6. The system of claim 1, wherein:
the one or more assistive features comprises sign language narration of audible sounds in the first scene;
the processor is further configured to:
- determine that an input command has not been received from the first user device within the threshold time period after presenting an audible sound in the first scene;
- in response to determining that the input command has not been received, translate the audible sound to sign language narration of the audible sound; and
- present the first scene on the first user device with the sign language narration of the audible sound.

7. The system of claim 1, wherein the one or more assistive features are not rendered on other user devices operated by respective other users interacting in the first scene in the virtual environment.

8. A method for performing a first task in a virtual environment comprising:
- monitoring a set of steps performed by each of a plurality of users to complete the first task in the virtual environment, wherein at least two or more users of the plurality of users perform a different set of steps to complete the first task;
- determining that at least a threshold number of users of the plurality of users completed the first task in the virtual environment by performing a particular set of steps in a particular sequence;
- receiving from the first user device a user credential associated with a first user, wherein the user credential provides the first user access to a virtual environment;
- authorizing, based on the user credential, a first avatar of the first user to enter the virtual environment;
- receiving from the first user device a request from the first user to perform the first task in the virtual environment;
- in response to receiving the request, accessing from the memory a first portion of metadata relating to a plurality of steps that can be performed to complete the first task, wherein the first portion relates only to the particular set of steps of the plurality of steps;
- transmitting, to the first user device, only the first portion of the metadata that relates to the particular set of steps for rendering the particular set of steps on the first user device, wherein transmitting only the first portion of the metadata causes the first user device to render only the particular set of steps from the plurality of steps;
- presenting a first scene to the first user in the virtual environment, wherein the first scene is associated with a first step to be performed by the first user in the virtual environment as part of completing the first task;
- determining that the first user has not responded to the presentation of the first scene for a threshold time period;
- in response to determining that the first user has not responded, obtaining one or more assistive features associated with the first scene, wherein the one or more assistive features are part of a plurality of assistive features configured to assist users in performing tasks in the virtual environment;
- presenting the first scene with the one or more assistive features;
- detecting, after presenting the first scene with the one or more assistive features, that the first user has provided an input associated with the first scene using the first user device; and
- processing the first step in the virtual environment based on the input provided by the first user.

9. The method of claim 8, further comprising:
presenting a second scene with a plurality of assistive features associated with the second scene by default;
detecting that the first user has turned off a first assistive feature of the plurality of assistive features;
detecting that the first user has not turned off a second assistive feature of the plurality of assistive features; and
in response to detecting that the first user has not turned off the second assistive feature, determining that the first user suffers with a disability associated with the second assistive feature; and
in response to determining that the first user suffers with the disability, presenting subsequent scenes associated with completing the first task to the first user with the second assistive feature.

10. The method of claim 8, wherein:
the one or more assistive features comprises audible narration of the first scene;
a memory stores properties associated with one or more visual elements to be displayed as part of the first scene in the virtual environment; and
further comprising:
  determining that an input command has not been received from the first user device within the threshold time period after presenting the first scene;
  in response to determining that the input command has not been received from the first user device, generating audible narration of the one or more visual elements in the first scene based on the properties associated with the one or more visual elements; and
  presenting the first scene on the first device with the audible narration of the one or more visual elements.

11. The method of claim 8, wherein:
the one or more assistive features comprises text narratives associated with the first scene;
a memory stores properties associated with one or more visual elements to be displayed as part of the first scene in the virtual environment; and
further comprising:
  determining that an input command has not been received from the first user device within the threshold time period after presenting the first scene;
  in response to determining that the input command has not been received from the first user device, generating text narratives of the one or more visual elements in the first scene based on the properties associated with the one or more visual elements; and
  presenting the first scene on the first device with the text narratives of the one or more visual elements.

12. The method of claim 8, wherein:
the one or more assistive features comprises repositioning of visual elements within the first scene;
further comprising:
  determining no input or less input by the first user originating from a portion of the first scene as compared to a remaining portion of the first scene;
  in response to determining no input or less input by the first user originating from a portion of the first scene, configuring the first scene by repositioning visual elements from the portion of the first scene to the remaining portion of the first scene; and
  presenting the first scene on the first user device with the repositioned visual elements.

13. The method of claim 8, wherein:
the one or more assistive features comprises sign language narration of audible sounds in the first scene;
further comprising:
  determining that an input command has not been received from the first user device within the threshold time period after presenting an audible sound in the first scene;
  in response to determining that the input command has not been received, translating the audible sound to sign language narration of the audible sound; and
  presenting the first scene on the first user device with the sign language narration of the audible sound.

14. The method of claim 8, wherein the one or more assistive features are not rendered on other user devices operated by respective other users interacting in the first scene in the virtual environment.

15. A non-transitory computer-readable medium storing instructions that when executed by a processor causes the processor to:
monitor a set of steps performed by each of a plurality of users to complete a first task in the virtual environment, wherein at least two or more users of the plurality of users perform a different set of steps to complete the first task;
determine that at least a threshold number of users of the plurality of users completed the first task in the virtual environment by performing a particular set of steps in a particular sequence;
receive from the first user device a user credential associated with a first user, wherein the user credential provides the first user access to a virtual environment;
authorize, based on the user credential, a first avatar of the first user to enter the virtual environment;
receive from the first user device a request from the first user to perform the first task in the virtual environment;
in response to receiving the request, access from the memory a first portion of metadata relating to a plurality of steps that can be performed to complete the first task, wherein the first portion relates only to the particular set of steps of the plurality of steps;
transmit, to the first user device, only the first portion of the metadata that relates to the particular set of steps for rendering the particular set of steps on the first user device, wherein transmitting only the first portion of the metadata causes the first user device to render only the particular set of steps from the plurality of steps;
present a first scene to the first user in the virtual environment, wherein the first scene is associated with a first step to be performed by the first user in the virtual environment as part of completing the first task;
determine that the first user has not responded to the presentation of the first scene for a threshold time period;
in response to determining that the first user has not responded, obtain one or more assistive features associated with the first scene, wherein the one or more assistive features are part of a plurality of assistive features configured to assist users in performing tasks in the virtual environment;
present the first scene with the one or more assistive features;
detect, after presenting the first scene with the one or more assistive features, that the first user has provided an input associated with the first scene using the first user device; and
process the first step in the virtual environment based on the input provided by the first user.

16. The non-transitory computer-readable medium of claim 15, wherein the instructions further cause the processor to:
- present a second scene with a plurality of assistive features associated with the second scene by default;
- detect that the first user has turned off a first assistive feature of the plurality of assistive features;
- detect that the first user has not turned off a second assistive feature of the plurality of assistive features; and
- in response to detecting that the first user has not turned off the second assistive feature, determine that the first user suffers with a disability associated with the second assistive feature; and
- in response to determining that the first user suffers with the disability, present subsequent scenes associated with completing the first task to the first user with the second assistive feature.

17. The non-transitory computer-readable medium of claim 15, wherein:
- the one or more assistive features comprises audible narration of the first scene;
- a memory stores properties associated with one or more visual elements to be displayed as part of the first scene in the virtual environment; and
- the instructions further cause the processor to:
    - determine that an input command has not been received from the first user device within the threshold time period after presenting the first scene;
    - in response to determining that the input command has not been received from the first user device, generate audible narration of the one or more visual elements in the first scene based on the properties associated with the one or more visual elements; and
    - present the first scene on the first device with the audible narration of the one or more visual elements.

18. The non-transitory computer-readable medium of claim 15, wherein:
- the one or more assistive features comprises text narratives associated with the first scene;
- a memory stores properties associated with one or more visual elements to be displayed as part of the first scene in the virtual environment; and
- the instructions further cause the processor to:
    - determine that an input command has not been received from the first user device within the threshold time period after presenting the first scene;
    - in response to determining that the input command has not been received from the first user device, generate text narratives of the one or more visual elements in the first scene based on the properties associated with the one or more visual elements; and
    - present the first scene on the first device with the text narratives of the one or more visual elements.

19. The non-transitory computer-readable medium of claim 15, wherein:
- the one or more assistive features comprises repositioning of visual elements within the first scene;
- the instructions further cause the processor to:
    - determine no input or less input by the first user originating from a portion of the first scene as compared to a remaining portion of the first scene;
    - in response to determining no input or less input by the first user originating from a portion of the first scene, configure the first scene by repositioning visual elements from the portion of the first scene to the remaining portion of the first scene; and
    - present the first scene on the first user device with the repositioned visual elements.

20. The non-transitory computer-readable medium of claim 15, wherein:
- the one or more assistive features comprises sign language narration of audible sounds in the first scene;
- the instructions further cause the processor to:
    - determine that an input command has not been received from the first user device within the threshold time period after presenting an audible sound in the first scene;
    - in response to determining that the input command has not been received, translate the audible sound to sign language narration of the audible sound; and
    - present the first scene on the first user device with the sign language narration of the audible sound.

* * * * *